United States Patent
Jeong et al.

(10) Patent No.: US 11,804,203 B2
(45) Date of Patent: Oct. 31, 2023

(54) DISPLAY APPARATUS

(71) Applicant: LG DISPLAY CO., LTD., Seoul (KR)

(72) Inventors: Uihyeon Jeong, Paju-si (KR); Chiwan Kim, Paju-si (KR); Yongwoo Lee, Paju-si (KR); Sungwook Ko, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 116 days.

(21) Appl. No.: 17/322,248

(22) Filed: May 17, 2021

(65) Prior Publication Data

US 2021/0366456 A1 Nov. 25, 2021

(30) Foreign Application Priority Data

May 19, 2020 (KR) .................. 10-2020-0059625

(51) Int. Cl.
*G10K 9/122* (2006.01)
*G06F 1/16* (2006.01)
*G06F 3/16* (2006.01)

(52) U.S. Cl.
CPC ........... *G10K 9/122* (2013.01); *G06F 1/1605* (2013.01); *G06F 3/16* (2013.01)

(58) Field of Classification Search
None
See application file for complete search history.

(56) References Cited

U.S. PATENT DOCUMENTS

| 2017/0099548 | A1* | 4/2017 | Schoeffmann | H04R 1/288 |
| 2018/0359590 | A1* | 12/2018 | Bocko | H04S 7/30 |
| 2019/0037165 | A1* | 1/2019 | Lee | H04R 1/025 |
| 2020/0097244 | A1* | 3/2020 | Kim | H02N 2/008 |
| 2020/0379709 | A1* | 12/2020 | Kim | G10K 9/128 |
| 2020/0404213 | A1* | 12/2020 | Won | H04R 11/02 |
| 2021/0144465 | A1* | 5/2021 | Sauer | H04R 1/288 |

* cited by examiner

*Primary Examiner* — Walter F Briney, III
(74) *Attorney, Agent, or Firm* — Morgan, Lewis & Bockius LLP

(57) ABSTRACT

A display apparatus includes a display panel configured to display an image, a vibration generating device at a rear surface of the display panel to vibrate the display panel, and a supporting member at the rear surface of the display panel and including a first hole. The first hole may be disposed at a whole region or periphery of the vibration generating device.

44 Claims, 9 Drawing Sheets

DISPLAY APPARATUS

CROSS-REFERENCE TO RELATED APPLICATIONS

This application claims the benefit of and priority to Korean Patent Application No. 10-2020-0059625 filed on May 19, 2020, the entirety of each which is hereby incorporated by reference.

TECHNICAL FIELD

The present disclosure relates to a display apparatus.

DISCUSSION OF THE RELATED ART

Display apparatuses are equipped in electronic devices, such as televisions (TVs), monitors, notebook computers, smartphones, tablet computers, electronic organizers, electronic pads, wearable apparatuses, watch phones, portable information apparatuses, navigation apparatuses, and automotive control display apparatuses, and are widely used as a screen for displaying an image.

Recently, the need for slimming and thinning of electronic devices is increasing. Therefore, the need for slimming and thinning speakers applied to electronic devices is increasing, and instead of voice coils, piezoelectric elements capable of being implemented to have a thin thickness are attracting much attention.

When piezoelectric elements are applied to display apparatuses, a thickness of the display apparatuses may be reduced, but there is a problem where it is difficult to realize a sound of a low-pitched sound band.

SUMMARY

Therefore, the inventors have recognized the problems described above and have invented a display apparatus having a new structure, which has a thin thickness and enhances a sound characteristic of a low-pitched sound band, thereby outputting a good-quality sound.

Accordingly, embodiments of the present disclosure are directed to a display apparatus that substantially obviates one or more problems due to limitations and disadvantages of the related art.

An aspect of the present disclosure is to provide a display apparatus having a structure, which enhances a sound characteristic of a low-pitched sound band without an increase in thickness of the display apparatus having a structure for outputting a sound, and thus, outputs an excellent sound.

Additional features and aspects will be set forth in part in the description which follows and in part will become apparent from the description or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus comprises a display panel configured to display an image, a vibration generating device at a rear surface of the display panel to vibrate the display panel, and a supporting member at the rear surface of the display panel and including a first hole.

In another aspect of the present disclosure, a display apparatus comprises a display panel configured to display an image and including a first region and a second region, a first vibration generating device at a rear surface of the display panel to vibrate the first region, a second vibration generating device at the rear surface of the display panel to vibrate the second region, and a supporting member at the rear surface of the display panel, the supporting member is configured to include a first hole corresponding to the first vibration generating device and the second vibration generating device.

In the display apparatus according to the embodiments of the present disclosure, a supporting member including a hole for discharging an air of an inner portion of the display apparatus may be provided, and thus, an air pressure of the inner portion of the display apparatus may be lowered to enlarge a reproduction band of the low-pitched sound band, thereby improving a low-pitched sound characteristic.

In the display apparatus according to the embodiments of the present disclosure, a sound absorbing member disposed at an inner surface of the supporting member may be provided and may absorb a vibration of the supporting member to enlarge the reproduction band of the low-pitched sound band, thereby improving the low-pitched sound characteristic.

In the display apparatus according to the embodiments of the present disclosure, a vibration plate disposed at an inner surface of the supporting member may be provided, and thus, a low-pitched sound may be realized by the vibration plate to enlarge the reproduction band of the low-pitched sound band, thereby improving the low-pitched sound characteristic.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

Figure 1:
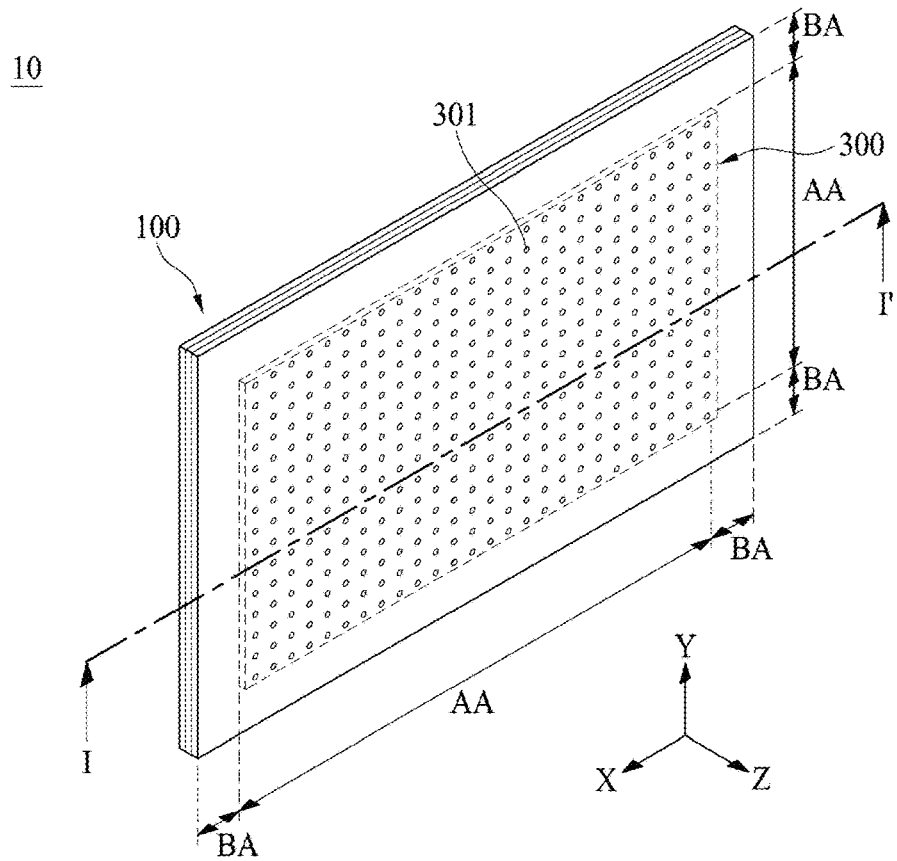
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the embodiments of present disclosure are not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In the description of embodiments, when a structure is described as being positioned "on or above" or "under or below" another structure, this description should be construed as including a case in which the structures contact each other as well as a case in which a third structure is disposed therebetween.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to embodiments of the present disclosure may use all types of display panels such as a liquid crystal display panel, an organic light emitting diode (OLED) display panel, and an electroluminescent display panel, but embodiments of the present disclosure are not limited to a specific display panel, which is vibrated by a vibration device (or a vibration apparatus) according to an embodiment of the present disclosure to output a sound. A shape or a size of a display panel applied to a display apparatus according to embodiments of the present disclosure is not limited thereto.

For example, when the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

When the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, a light emitting layer, or the like). As another example, the layer provided on the array substrate may include a micro light emitting diode.

In the present disclosure, the display apparatus may further include a backing, such as a metal plate attached on the display panel, but embodiments of the present disclosure are not limited thereto, other structures may also be included, for example other structures made of different materials.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Hereinafter, a display apparatus according to some embodiments of the present disclosure will be described in detail with reference to the accompanying drawings.

Figure 2:
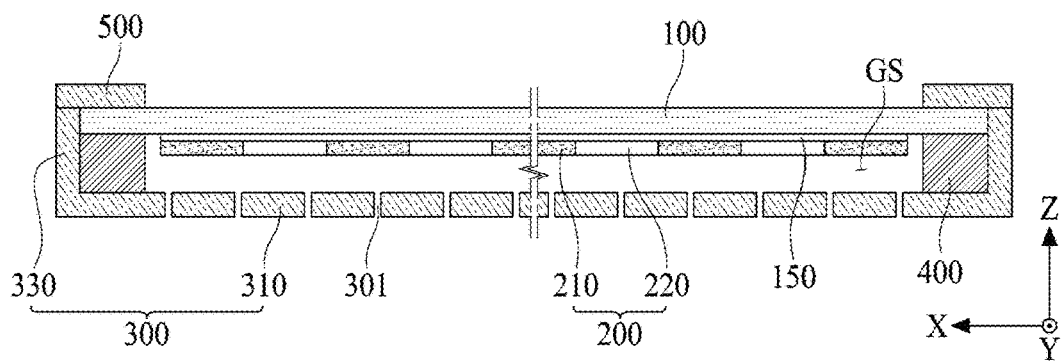
FIG. 2 is a cross-sectional view taken along line I-I' illustrated in FIG. 1.

FIG. 1 illustrates a display apparatus according to an embodiment of the present disclosure. FIG. 2 is a cross-sectional view taken along line I-I' illustrated in FIG. 1.

With reference to FIGS. 1 and 2, the display apparatus 10 according to an embodiment of the present disclosure may include a display panel 100, a vibration generating device 200 disposed on a rear surface (or a backside surface, hereinafter referred to as the rear surface) of the display panel 100, and a supporting member 300 disposed at the rear surface of the display panel 100.

The display panel 100 may display an image (for example, an electronic image or a digital image). For example, the display panel 100 may output light to display an image.

According to an embodiment of the present disclosure, the display panel 100 may be a curved display panel or one of all types of display panels such as a liquid crystal display panel, an organic light emitting display panel, a micro light emitting diode display panel, an electroluminescent display panel, and an electro-wetting display panel, but embodiments of the present disclosure are not limited thereto. According to another embodiment of the present disclosure, the display panel 100 may be a flexible display panel. For example, the display panel 100 may be a flexible liquid crystal display panel, a flexible organic light emitting display panel, a flexible micro light emitting diode display panel, a flexible electroluminescent display panel, or a flexible electro-wetting display panel, but embodiments of the present disclosure are not limited thereto. According to another embodiment of the present disclosure, the display panel 100 may be a display panel with integrated touch panel. For example, the display panel with integrated touch panel may include a touch panel attached on a display panel, or may include a touch electrode layer disposed at the display panel.

The display panel 100 according to an embodiment of the present disclosure may include a display area AA, which displays an image based on driving of a plurality of pixels arranged on a substrate, and a non-display area BA which surrounds the display area. For example, the display panel 100 may be implemented so that an entire front surface of the substrate is implemented as the display area without the non-display area, based on a non-bezel (or bezelless) structure. For example, the display panel 100 may be a transparent display panel which includes a light transmission portion disposed at at least one of the plurality of pixels.

The display panel 100 according to an embodiment of the present disclosure may display an image in a type such as a top emission type, a bottom emission type, or a dual emission type, based on a structure of a pixel array layer including an anode electrode, a cathode electrode, and a light emitting device layer. In the top emission type, visible light emitted from the pixel array layer may be irradiated onto a region in front of a base substrate to allow an image to be displayed, and in the bottom emission type, the visible light emitted from the pixel array layer may be irradiated onto a rearward region behind the base substrate to allow an image to be displayed. In the dual emission type, the visible light emitted from the pixel array layer may be irradiated onto a region in front and a rearward region behind the base substrate to allow an image to be displayed.

For example, the light emitting device layer may include an organic light emitting layer or a micro light emitting diode device which is electrically connected to each of the anode electrode and the cathode electrode. The micro light emitting diode device may be a light emitting diode implemented as an integrated circuit (IC) type or a chip type and may include a first terminal electrically connected to the anode electrode and a second terminal electrically connected to the cathode electrode. The cathode electrode may be connected to a light emitting device of the light emitting device layer provided in each pixel area in common.

The display panel 100 according to an embodiment of the present disclosure may include a bending portion which is bent or curved to have a curved shape or a certain curvature radius.

The bending portion of the display panel 100 may be implemented in at least one of one edge (or one periphery) and the other edge (or the other periphery) of the display panel 100 which are parallel to each other. The one edge and/or the other edge, where the bending portion is implemented, of the display panel 100 may include only the non-display area BA, or may include an edge of the display area AA and the non-display area BA. For example, the display panel 100 including the bending portion provided by bending of the non-display area BA may have a structure where a one-side bezel bending structure or a both-side bezel bending structure. Also, the display panel 100 including the edge of the display area AA and the bending portion provided by bending of the non-display area BA may have a structure where a one-side active bending structure or a both-side active bending structure.

The supporting member 300 may be referred to as the other term such as a cover bottom, a plate bottom, a back cover, a base frame, a metal frame, a metal chassis, a chassis base, or an m-chassis. Therefore, the supporting member 300 may be implemented as an arbitrary type frame or a plate structure, which is disposed on the rear surface of the display apparatus 10 (or the display panel 100). The supporting member 300 may be a rear structure.

The supporting member 300 may cover the rear surface of the display panel 100. For example, the supporting member 300 may cover the whole rear surface of the display panel 100 with a gap space GS therebetween. For example, the supporting member 300 may include at least one of a glass material, a metal material, and a plastic material. For example, the supporting member 300 including the glass material may be sapphire glass. For example, the supporting member 300 including the metal material may include one or more of aluminum (Al), an Al alloy, a magnesium (Mg), a Mg alloy, and an iron (Fe)-nickel (Ni) alloy, but embodiment of the present disclosure are not limited thereto.

The inventors have recognized a problem where a sound characteristic of a low-pitched sound band is reduced when a vibration generating device 200 is configured with a piezoelectric element, and thus, have performed various experiments for improving a sound characteristic of the low-pitched sound band. Through the various experiments, the inventors have invented a display apparatus having a new structure for enhancing a sound characteristic of the low-pitched sound band. This will be described below in detail.

The inventors have recognized that an internal air pressure of a display apparatus 10 should be reduced for improving a sound characteristic of a low-pitched sound band. For example, when an air pressure of the inner portion of the display apparatus 10 is discharged to an outside, a sound of a vibration generating device 200 may be improved. The vibration generating device 200 may be disposed between a display panel 100 and a supporting member 300, and thus, a structure for discharging the internal air pressure of the display apparatus 10 to the outside may be needed. The supporting member 300 may include a first hole 301, to discharge the internal air pressure of the display apparatus 10 to the outside to decrease the internal air pressure of the display apparatus 10. The first hole 301 of the supporting member 300 may be disposed at a certain region of the supporting member 300, to decrease an internal air pressure of a gap space GS of the display apparatus 10. For example, the first hole 301 of the supporting member 300 may decrease the internal air pressure of the gap space GS to enlarge a band of the low-pitched sound band, thereby improving the sound characteristic of the low-pitched sound band. When the first hole 301 is not disposed at the supporting member 300, the internal air pressure of the vibration generating device 200 may be increased by a sound or a sound wave generated based on a vibration of the vibration generating device 200, and thus, the sound characteristic of the low-pitched sound band may be reduced. According to an embodiment of the present disclosure, when the first hole 301 is disposed at the supporting member 300, air may be discharged through the first hole 301 despite a sound wave or a sound being generated based on a vibration of the vibration generating device 200, and thus, the internal air pressure of the gap space GS may be lowered. Accordingly, a band of the low-pitched sound band may be enlarged, and thus, the sound characteristic of the low-pitched sound band may be improved.

For example, when a sound wave is generated based on a vibration of the vibration generating device 200, the first hole 301 may be disposed at a position for decreasing the internal air pressure of the gap space GS. For example, the shape, number, and size of the first hole 301 may be variously adjusted. As illustrated in FIG. 1, the first hole 301 may be arranged at a certain interval (or distance) in a region, corresponding to the vibration generating device 200, of a region of the supporting member 300. According to an embodiment of the present disclosure, the first hole 301 may be disposed along a portion (for example, a periphery) of the vibration generating device 200. According to an embodiment of the present disclosure, the arrangement number and arrangement area of the first hole 301 may be determined based on the intensity of a sound wave generated from a vibration of the vibration generating device 200.

For example, comparing with a first hole 301 disposed at a region which a sound wave having low intensity reaches, a first hole 301 disposed at a region, which a sound wave having high intensity reaches, among the region of the supporting member 300 may be provided more or may be disposed to have a larger area. For example, comparing with a first hole 301 disposed at a region which a sound wave having low intensity reaches, a plurality of first holes 301 may be disposed at the supporting member 300 so that more air is discharged to the outside, in a region which a sound wave having high intensity reaches. For example, when a first region, which a sound wave having first intensity reaches, of the supporting member 300 and a second region, which a sound wave having second intensity less than first intensity reaches of the supporting member 300 are provided, a total area of the first hole 301 disposed at the first region may be greater than a total area of the first hole 301 disposed at the second region. For example, an area of the first hole 301 disposed at the first region of the supporting member 300 may be the same as that of the first hole 301 disposed at the second region of the supporting member 300, and more first holes 301 may be disposed at the first region of the supporting member 300. As another example, the first hole 301 disposed at the first region of the supporting member 300 may have an area which is greater than that of the first hole 301 disposed at the second region and may be provided fewer than the number of first holes 301 disposed at the second area.

The supporting member 300 according to an embodiment of the present disclosure may additionally cover a side surface (or a lateral side surface) of the display panel 100. For example, the supporting member 300 may include a rear surface portion 310 which covers the rear surface of the display panel 100 with the gap space GS therebetween and a side surface portion 330 which is connected to an end of the rear surface portion 310 and covers the side surface of the display panel 100. However, embodiments of the present disclosure are not limited thereto, and the supporting member 300 may be a single-body structure where the rear surface portion 310 and the side surface portion 330 are provided as one body.

The side surface portion 330 may be implemented as a separate middle frame connected to the supporting member 300. For example, the side surface portion 330 implemented as the middle frame may cover the supporting member 300, and for example, may cover one or more of a side surface of the rear surface portion 310 and the side surface of the display panel 100. For example, the side surface portion 330 implemented as the middle frame may include a material that is the same as or different from that of the supporting member 300 among a metal material and plastic material.

The supporting member 300 according to an embodiment of the present disclosure may be disposed to a rear periphery (or a rear edge) of the display panel 100 or a periphery of the rear surface of the display panel 100 by a panel connection member 400. For example, the panel connection member 400 may be disposed between the rear periphery of the display panel 100 and a front periphery (or an edge) of the supporting member 300 (or a periphery of a front surface of the supporting member 300), and may attach the display panel 100 to the supporting member 300. The panel connection member 400 according to an embodiment of the present disclosure may be implemented with a double-sided tape, a single-sided tape, a double-sided foam pad, a single-sided adhesive pad, a double-sided adhesive pad, a single-sided adhesive foam pad, or a double-sided adhesive foam pad, but embodiments of the present disclosure are not limited thereto.

The display apparatus according to an embodiment of the present disclosure may further include a front member 500 which covers the non-display area BA of the display panel 100. The front member 500 may have a picture frame shape which includes an opening portion overlapping the display area AA of the display panel 100. For example, the front member 500 may be coupled (or connected) to the rear surface portion 310 or the middle frame and may cover the non-display area BA of the display panel 100, thereby supporting or fixing the display panel 100. The front member 500 may be in a front edge (or a front periphery) of the display panel 100 and may be directly exposed at a user (or a viewer), and due to this, an aesthetic design appearance of the display apparatus 10 may be reduced and a bezel width of the display apparatus 10 may increase. To solve such a problem, the display panel 100 may be connected to the supporting member 300 by the panel connection member 400, and thus, the front member 500 may be omitted (or removed), thereby decreasing the bezel width of the display apparatus 10 and enhancing the aesthetic design appearance of the display apparatus 10.

The vibration generating device 200 may be disposed at or connected to the rear surface of the display panel 100. The vibration generating device 200 may be attached to the rear surface of the display panel 100 by an adhesive member 150.

The adhesive member 150 according to an embodiment of the present disclosure may be disposed between the rear surface of the display panel 100 and the vibration generating device 200. For example, the adhesive member 150 may include an adhesive or a double-sided adhesive tape including an adhesive layer which is good in an adhesive force or an attaching force. For example, the adhesive layer of the adhesive member 150 may include epoxy, acryl, silicone, urethane, or paraffin wax, but embodiments of the present disclosure are not limited thereto. The adhesive layer of the adhesive member 150 may further include an additive such as a tackifier, a wax component, or an anti-oxidation agent. The additive may prevent (or reduce) the adhesive member 150 from being detached (stripped) from the display panel 100 by a vibration of the vibration device 200. For example, the tackifier may be rosin derivative or the like, the wax component may be paraffin wax or the like, and the anti-oxidation agent may be a phenol-based anti-oxidation agent, such as thioester. However, embodiments of the present disclosure are not limited thereto.

According to another embodiment of the present disclosure, the adhesive member 150 may further include a hollow portion provided between the display panel 100 and the vibration generating device 200. The hollow portion of the adhesive member 150 may provide an air gap between the display panel 100 and the vibration generating device 200. Due to the air gap, a sound wave (or a sound pressure level, or a sound) based on a vibration of the vibration generating device 200 may not be dispersed by the adhesive member 150 and may concentrate on the display panel 100, and thus, the loss of a vibration caused by the adhesive member 150 may be minimized, thereby increasing a sound pressure level characteristic of a sound generated based on a vibration of the display panel 100.

The vibration generating device 200 according to an embodiment of the present disclosure may be implemented as a film type. Because the vibration generating device 200 may be implemented as a film type, the vibration generating device 200 may have a thickness which is thinner than that of the display panel 100, and thus, a thickness of the display panel 100 may not increase despite the arrangement of the vibration generating device 200. The vibration generating device 200 may be referred to as a flexible sound generator, a flexible sound generating module, a flexible sound generating device, a flexible actuator, a flexible speaker, a flexible piezoelectric speaker, a sound generating module, a sound generating device, a film actuator, a film type piezoelectric composite actuator, a film speaker, a film type piezoelectric speaker, or a film type piezoelectric composite speaker, which uses the display panel 100 as a vibration plate, but embodiments of the present disclosure are not limited thereto.

The vibration generating device 200 according to an embodiment of the present disclosure may include a plurality of first portions 210 and a plurality of second portions 220. For example, the plurality of first portions 210 may have a piezoelectric characteristic, the plurality of second portions 220 may improve or compensate an impact resistance of the first portion 210 and have flexibility.

The plurality of first portions 210 according to an embodiment of the present disclosure may each be configured as an inorganic material portion. The inorganic material portion may include an electroactive material. The electroactive material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto.

Each of the plurality of second portions 220 according to an embodiment of the present disclosure may be configured as an organic material portion, and may fill a space between the inorganic material portions, which are the first portions 210. Each of the organic material portions may include a flexible material. Each of the organic material portions may be between the plurality of inorganic material portions, may absorb an impact or shock applied to the inorganic material portions (or the first portions), may release a stress concentrating on the inorganic material portion to enhance the total durability of the vibration generating device 200, and may provide flexibility to the vibration generating device 200. The vibration generating device 200 may have flexibility. Thus, the vibration generating device 200 may be bent in a shape matching that of the display panel 100.

Each of the plurality of second portions 220 may be disposed between the plurality of first portions 210. The plurality of first portions 210 and the plurality of second portions 220 may be disposed (or arranged) at the same plane (or the same layer) in parallel. For example, the first portions 210 and the second portions 220 may be alternately and repeatedly disposed (or connected) at the same plane in parallel to have a single thin-film type. Thus, the vibration generating device 200 may have a single thin-film type. For example, the plurality of first portions 210 may have a structure connected to one side. For example, the plurality of first portions 210 may have a structure connected to the entire vibration generating device 200. Each of the plurality of second portions 220 may be configured to fill a gap or a space between two adjacent first portions of the plurality of first portions 210, and may be connected to or attached to a first portion 210 adjacent thereto. Therefore, in the vibration generating device 200, vibration energy by a link in a unit lattice of each first portion 210 may increase by a corresponding second portion 220. Thus, a vibration may increase, and a piezoelectric characteristic and flexibility may be secured. Moreover, in the vibration generating device 200, the first portions 210 and the second portions 220 may be alternately and repeatedly disposed at the same plane in a lengthwise direction X with respect to one side of the vibration generating device 200, and thus may configure a large-area composite film (or an organic/inorganic composite film) having a single-layer structure, and the large-area composite film may have a thin thickness, whereby a thickness of the display apparatus 10 may not increase.

Therefore, in the vibration generating device 200 of the display apparatus 10 according to an embodiment of the present disclosure, an inorganic material portion (a first portion) and an organic material portion (a second portion) may be disposed on the same layer, and thus, an impact transferred to the inorganic material portion may be absorbed by the organic material portion, thereby preventing the inorganic material portion from being damaged by an external impact applied from the outside to the display apparatus 10 and minimizing a reduction in vibration performance (or a reduction in sound performance) caused by damage.

Moreover, the vibration generating device 200 of the display apparatus according to an embodiment of the present disclosure may include piezoelectric ceramic having a perovskite crystalline structure, and thus, may vibrate (or mechanical displacement) in response to an electrical signal applied from the outside. For example, when an alternating current (AC) voltage is applied to the inorganic material portion (the first portion), the inorganic material portion may alternately contract and expand based on an inverse piezoelectric effect, and thus, based on a bending phenomenon where a bending direction is alternately changed, the vibration generating device 200 may vibrate to vibrate the display panel 100 based on the vibration to provide a sound or a haptic feedback to a user.

Moreover, the vibration generating device 200 according to an embodiment of the present disclosure may have a size corresponding to the display area AA of the display panel 100. A size of the vibration generating device 200 may be 0.9 to 1.1 times a size of the display area AA, but embodiments of the present disclosure are not limited thereto. For example, a size of the vibration generating device 200 may be the same as or approximately equal to that of the display area AA of the display panel 100, and thus, the vibration generating device 200 may cover a most region of the display panel 100 and a vibration generated by the vibration generating device 200 may vibrate a whole portion of the display panel 100, and thus, localization of a sound may be high, and satisfaction of a user may be improved.

Also, a contact area (or panel coverage) between the display panel 100 and the vibration generating device 200 may increase, and thus, a vibration region of the display panel 100 may increase, thereby improving a sound of a middle-pitched to low-pitched sound band generated based on a vibration of the display panel 100. Also, in a large-sized display apparatus, a whole portion of the display panel 100 having a large size (or a large area) may vibrate, and thus, localization of a sound based on a vibration of the display panel 100 may be more enhanced, thereby realizing a stereophonic sound effect.

Therefore, the vibration generating device 200 according to an embodiment of the present disclosure may be disposed at the rear surface of the display panel 100 to sufficiently vibrate the display panel 100 in a vertical (or horizontal or front-rear) direction, thereby outputting a desired sound to a forward region in front of the display apparatus. Also, the vibration generating device 200 may be implemented in a pattern shape including an organic material portion and an inorganic material portion, and thus, an area (or a size) of the vibration generating device 200 may infinitely increase, whereby the panel coverage of the vibration generating device 200 may increase with respect to the display panel 100 to enhance a sound characteristic based on a vibration of the display panel 100.

Moreover, the vibration generating device 200 may be implemented with one film, and thus, may be slimmed, thereby reducing or preventing the increase in a driving voltage. For example, the vibration generating device 200 may be configured to have a wide area corresponding to the same size as that of the display panel 100, and thus, a sound pressure characteristic of a low-pitched sound band which is a drawback of a film type piezoelectric or a stack type piezoelectric may be improved and the driving voltage may be reduced. Also, the vibration generating device 200 according to an embodiment of the present disclosure may include the inorganic material portion and the organic material portion and may be implemented as a thin film type, and thus, may be integrated into or equipped in the display apparatus 10 without interference caused by a mechanical element and/or another element configuring the display apparatus 10.

The vibration generating device 200 may vibrate based on an electrical signal applied through the flexible cable to vibrate the display panel 100. For example, the vibration generating device 200 may be a sound generating device which vibrates based on a signal synchronized with an image displayed by the display panel 100 to vibrate the display panel 100, thereby generating a sound. As another example, the vibration generating device 200 may be a haptic device which vibrates based on a haptic feedback signal (or a tactile feedback signal) synchronized with a user touch applied to a touch panel (or a touch sensor layer) disposed at or embedded into the display panel 100 to vibrate the display panel 100. For example, the vibration generating device 200 may be a haptic device which vibrates the display panel 100 to output a feedback based on an action (or motion) of a user. Accordingly, the display panel 100 may vibrate based on a vibration of the vibration generating device 200 to provide a user (or a viewer) with at least one or more of a sound and a haptic feedback.

Figure 3:
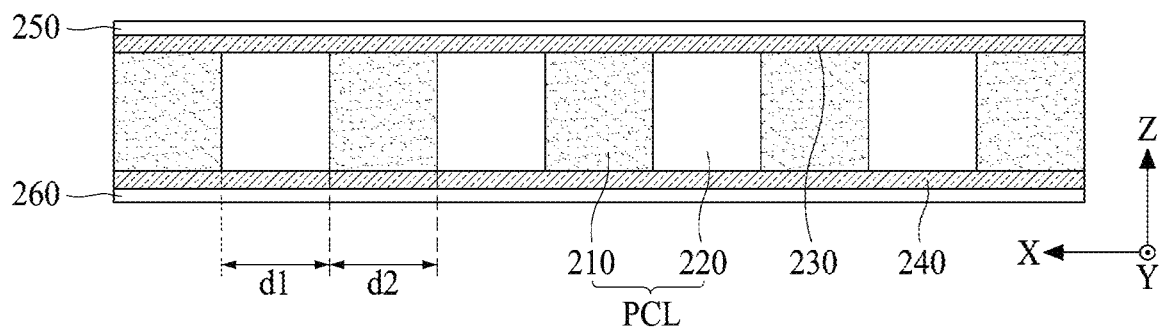
FIG. 3 illustrates a vibration generating device according to an embodiment of the present disclosure.

FIG. 3 illustrates a vibration generating device according to an embodiment of the present disclosure.

With reference to FIG. 3, in conjunction with FIG. 2, the vibration generating device 200 according to an embodiment of the present disclosure may include a piezoelectric composite layer PCL, a first electrode 230, and a second electrode 240. The piezoelectric composite layer PCL may include a plurality of first portions 210 and a plurality of second portions 220 each disposed between the plurality of first portions 210.

The piezoelectric composite layer PCL may be referred to, for example, as a vibration layer, a piezoelectric layer, a piezoelectric material layer, an electroactive layer, a vibration portion, a piezoelectric material portion, an electroactive portion, a piezoelectric structure, a piezoelectric composite, or a piezoelectric ceramic composite, but embodiments of the present disclosure are not limited thereto.

The piezoelectric composite layer (PCL) may be formed of a transparent piezoelectric, a semitransparent (or translucent) piezoelectric, or an opaque piezoelectric material, and may be a transparent, a semitransparent or an opaque.

Each of the plurality of first portions 210 according to an embodiment of the present disclosure may include an inorganic material or a piezoelectric material, each of which vibrating based on a piezoelectric effect (or a piezoelectric characteristic) caused by an electric field. For example, each of the plurality of first portions 210 may be referred to as an electroactive portion, an inorganic material portion, a piezoelectric material portion, or a vibration portion, but embodiments of the present disclosure are not limited thereto.

Each of the plurality of first portions 210 according to an embodiment of the present disclosure may include a ceramic-based material for generating a relatively high vibration, or may include a piezoelectric ceramic having a perovskite-based crystalline structure. The perovskite crystalline structure may have a piezoelectric effect and an inverse piezoelectric effect, and may be a structure having orientation. The perovskite crystalline structure may be represented by a chemical formula "ABO$_3$". In the chemical formula, "A" may include a divalent metal element, and "B" may include a tetravalent metal element. For example, in the chemical formula "ABO$_3$", "A", and "B" may be cations, and "O" may be anions. For example, the chemical formula "ABO$_3$" may include at least one or more among lead(II) titanate (PbTiO$_3$), lead zirconate (PbZrO$_3$), barium titanate (BaTiO$_3$), and strontium titanate (SrTiO$_3$), but embodiments of the present disclosure are not limited thereto.

When the perovskite crystalline structure includes a center ion (for example, PbTiO$_3$, e.g., lead(II) titanate, lead titanium oxide, or lead titanate with a perovskite structure), a position of a titanium (Ti) ion may be changed by an external stress or a magnetic field. Thus, polarization may be changed, thereby generating a piezoelectric effect. For example, in the perovskite crystalline structure, a cubic shape corresponding to a symmetric structure may be changed to a tetragonal (or quadrilateral), orthorhombic, or rhombohedral structure corresponding to an unsymmetric structure. Thus, a piezoelectric effect may be generated. In a tetragonal, orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

As an embodiment of the present disclosure, the inorganic material portion provided in each of the plurality of first portions 210 may include a material, including one or more of lead (Pb), zirconium (Zr), titanium (Ti), zinc (Zn), nickel (Ni), and niobium (Nb), but embodiments of the present disclosure are not limited thereto.

As another example, the inorganic material portion provided in each of the plurality of first portions 210 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the inorganic material portion may include at least one of calcium titanate (CaTiO$_3$), BaTiO$_3$, and SrTiO$_3$, each without Pb, but embodiments of the present disclosure are not limited thereto.

Each of the plurality of first portions 210 may include a polygonal pattern. For example, each of the plurality of first portions 210 may be a line pattern having a predetermined first width d1. For example, each of the plurality of first portions 210 may be spaced apart from one another by a predetermined second width d2 (or a certain interval or distance) in a first direction X, and may be in parallel in a second direction Y intersecting the first direction X. Each of the plurality of first portions 210 may have the same size, for example, the same width, area, or volume, within a process error range (or an allowable error or a tolerance) occurring in a manufacturing process.

Each of the plurality of second portions 220 according to an embodiment of the present disclosure may have modulus and viscoelasticity that are lower than those of each first portion 210. Thus, the plurality of second portions 220 may enhance the reliability of each first portion 210 vulnerable to an impact due to a fragile characteristic. For example, when the vibration generating device 200 for vibrating the display panel 100 has an impact resistance and high stiffness, the vibration generating device 200 may have a high or maximum vibration characteristic. For the vibration generating device 200 to have an impact resistance and high stiffness, the plurality of second portions 220 may each include a material having a relatively high damping factor (tan δ) and relatively high stiffness. For example, the plurality of second portions 220 may each include a material having a damping factor (tan δ) of about 0.1 to about 1 and relatively high stiffness of about 0 [GPa] to about 10 [GPa]. Also, a damping factor (tan δ) and a stiff characteristic may be described based on a correlation between a loss coefficient and modulus. For example, the plurality of second portions 220 may each include a material having a loss coefficient (or loss factor) of about 0.01 to about 1.0 and modulus of about 0.1 [GPa] to about 10 [GPa].

The organic material portion in each of the plurality of second portions 220 may include an organic material or an organic polymer that each has a flexible characteristic in comparison with the inorganic material portion of each of the first portions 210. For example, each of the plurality of second portions 220 may include one or more of an organic material, an organic polymer, an organic piezoelectric material, and an organic non-piezoelectric material. For example, each of the plurality of second portions 220 may be referred to an adhesive portion, an elastic portion, a bending portion, a damping portion, or a flexible portion having flexibility, but embodiments of the present disclosure are not limited thereto.

An organic material portion according to an embodiment of the present disclosure may include at least one of an organic piezoelectric material and an organic non-piezoelectric material.

An organic material portion including an organic piezoelectric material may absorb an impact applied to an inorganic material portion (or a first portion 210). Thus, the organic material portion may enhance the total durability of the vibration generating device 200, and may provide a piezoelectric characteristic corresponding to a certain level or more. The organic piezoelectric material according to an embodiment of the present disclosure may be an organic material having an electroactive characteristic. An organic material portion including an organic non-piezoelectric material may include a curable resin composition and an adhesive including the curable resin composition. Thus, the organic material portion may absorb an impact applied to an inorganic material portion (or a first portion), thereby enhancing the total durability of the vibration generating device 200. The organic non-piezoelectric material according to an embodiment of the present disclosure may include at least one or more of an epoxy-based polymer, an acryl-based polymer, and a silicone-based polymer, but embodiments of the present disclosure are not limited thereto.

As an embodiment of the present disclosure, an organic material portion including an organic non-piezoelectric material may include an adhesion promoter or an adhesion enhancing agent for adhesiveness between epoxy resin and an inorganic material portion, for a high stiffness characteristic for the vibration generating device 200. For example, the adhesion promoter may be phosphate or the like, but embodiments of the present disclosure are not limited thereto. The organic material portion may be cured by at least one curing process of a thermal curing process and a photo-curing process. In a process of curing the organic material portion, epoxy resin of solvent free type may be used for avoiding or preventing the thickness uniformity of the vibration generating device 200 from being reduced by contraction of the organic material portion caused by volatilization of a solvent.

Moreover, the organic material portion including the organic non-piezoelectric material may further include a reinforcing agent, e.g., for a damping characteristic in addition to high stiffness of the vibration generating device 200. For example, the reinforcing agent may be methylmethacrylate-butadiene-styrene (MBS) having a core shell type, and a content thereof may be about 5 wt % to about 40 wt %. The reinforcing agent may be an elastic body having the core cell type, and may have a high coupling force to epoxy resin, such as an acryl-based polymer. Thus, the reinforcing agent may enhance an impact resistance or a damping characteristic of the vibration generating device 200.

Each of the plurality of second portions 220 may include a pattern of a polygonal shape. Each of the plurality of second portions 220 may be disposed between the plurality of first portions 210. The plurality of first portions 210 and the plurality of second portions 220 may be disposed (or arranged) at the same plane (or the same layer) in parallel. Each of the plurality of second portions 220 may fill a gap between two adjacent first portions of the plurality of first portions 210, and may be connected to or attached to a first portion 210 adjacent thereto. For example, each of the plurality of second portions 220 may be a line pattern having a predetermined second width d2. Each of the plurality of second portions 220 may be disposed parallel to each other with the first portions 210 therebetween. Each of the plurality of second portions 220 may have the same size, for example, the same width, area, or volume, within a process error range (or an allowable error or a tolerance) occurring in a manufacturing process.

A size of each of the second portions 220 may be the same as or different from that of each first portion 210. For example, a size of each first portion 210 and a size of each second portion 220 may be adjusted based on a desired condition including the vibration characteristic and/or flexibility of the vibration generating device 200.

Therefore, in the piezoelectric composite layer PCL, the first portions 210 including an inorganic material and having a piezoelectric characteristic, and the second portions 220 including an organic material and having flexibility, may be alternately repeated and connected to one another, and thus, the piezoelectric composite layer PCL may have a thin-film type. Therefore, the piezoelectric composite layer PCL may be bent based on a shape of the display panel 100, and may have a size corresponding to the display panel 100, or may have a size for realizing a vibration characteristic or a sound characteristic, which may each be adjusted based on a vibration of the display panel 100. For example, a size of each first portion 210 and a size of each second portion 220 may be adjusted based on a piezoelectric characteristic and flexibility. For example, in a display apparatus desiring more of a piezoelectric characteristic than flexibility, a size of each first portion 210 may be greater than that of each second portion 220. As another example, in a display apparatus desiring more flexibility than a piezoelectric characteristic, a size of each second portion 220 may be greater than that of each first portion 210. Thus, the piezoelectric composite layer PCL may be configured by adjusting the first portion 210 and the second portion 220 based on a characteristic needed for a display apparatus, and thus, may be easily designed.

The first electrode 230 may be disposed at a first surface (or an upper surface, hereinafter referred to as the first surface) of the piezoelectric composite layer PCL, and the first surface may be a surface facing the display panel 100. The first electrode 230 may be commonly disposed or coupled to a first surface of each of the plurality of first portions 210 and a first surface of each of the plurality of second portions 220, and may be electrically connected to the first surface of each of the plurality of first portions 210. For example, the first electrode 230 may have a single-body electrode type which is disposed at a whole first surface of the piezoelectric composite layer PCL. For example, the first electrode 230 may have substantially the same shape as the piezoelectric composite layer PCL, but embodiments of the present disclosure are not limited thereto. The first electrode 230 according to an embodiment of the present disclosure may include a transparent conductive material, a semitransparent (or translucent) conductive material, or an opaque conductive material. For example, the transparent conductive material or the semitransparent conductive material may include indium tin oxide (ITO) or indium zinc oxide (IZO), but embodiments of the present disclosure are not limited thereto. For example, the opaque conductive material may include aluminum (Al), copper (Cu), gold (Au), silver (Ag), molybdenum (Mo), magnesium (Mg), and an alloy of any thereof, but embodiments of the present disclosure are not limited thereto.

The second electrode 240 may be disposed at a second surface (or a rear surface, hereinafter referred to as the second surface) of the piezoelectric composite layer PCL, and the second surface may be a surface facing the rear surface portion 310 of the supporting member 300. The second electrode 240 may be commonly disposed or coupled to a second surface of each of the plurality of first portions 210 and a second surface of each of the plurality of second portions 220, and may be electrically connected to the second surface of each of the plurality of first portions 210. For example, the second electrode 240 may have a single-body electrode type which is disposed at a whole second surface of the piezoelectric composite layer PCL. For example, the second electrode 240 may have substantially the same shape as the piezoelectric composite layer PCL, but embodiments of the present disclosure are not limited thereto. The second electrode 240 according to an embodiment of the present disclosure may include a transparent conductive material, a semitransparent (or translucent) conductive material, or an opaque conductive material. For example, the second electrode 240 may include the same material as that of the first electrode 230, but embodiments of the present disclosure are not limited thereto.

The piezoelectric composite layer PCL may be polarized (or poling) by a certain voltage applied to the first electrode 230 and the second electrode 240 in a certain temperature atmosphere, or a temperature atmosphere that may be changed from a high temperature to a room temperature, but embodiments of the present disclosure are not limited thereto. For example, the piezoelectric composite layer PCL may alternately and repeatedly contract and expand based on an inverse piezoelectric effect according to a sound signal (or a voice signal) applied to the first electrode 230 and the second electrode 240 from the outside to vibrate. For example, the piezoelectric composite layer PCL may vibrate based on a vertical-direction (or a thickness direction Z) vibration d33 and a horizontal-direction (or a planar direction) vibration d31 by the first electrode 230 and the second electrode 240. The displacement of the display panel 100 may be increased by contraction and expansion of the piezoelectric composite layer PCL in the horizontal-direction, thereby further improving vibration of the display panel 100.

The vibration generating device 200 according to an embodiment of the present disclosure may further include a first protection layer 250 and a second protection layer 260.

The first protection layer 250 may be disposed on the first electrode 230, and may protect the first surface of the piezoelectric composite layer PCL or the first electrode 230. For example, the first protection layer 250 may be a polyimide (PI) film or a polyethyleneterephthalate (PET) film, but embodiments of the present disclosure are not limited thereto.

The second protection layer 260 may be disposed on the second electrode 240, and may protect the second surface of the piezoelectric composite layer PCL or the second electrode 240. For example, the second protection layer 260 may be a polyimide (PI) film or a polyethyleneterephthalate (PET) film, but embodiments of the present disclosure are not limited thereto.

Figure 4:
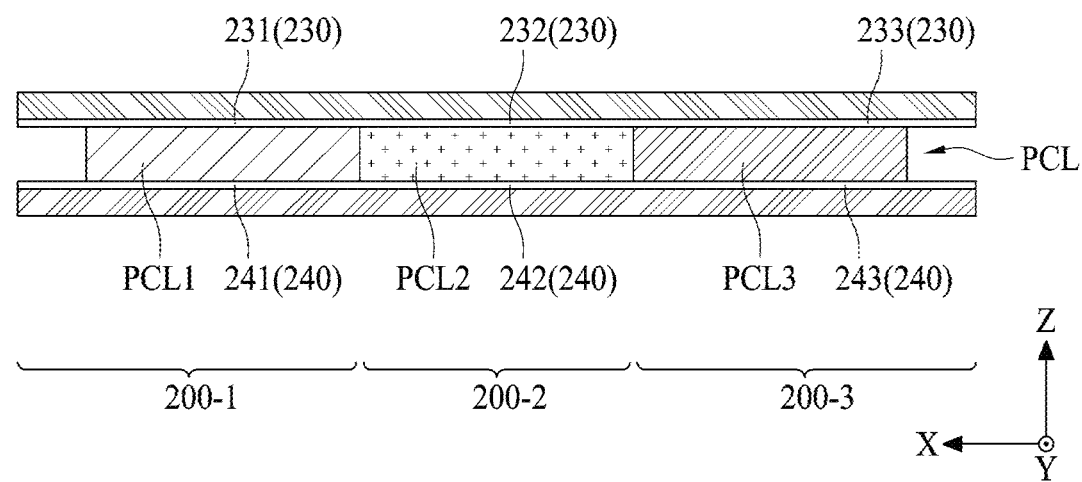
FIG. 4 illustrates a vibration generating device according to another embodiment of the present disclosure.

FIG. 4 is a cross-sectional view illustrating another embodiment of a vibration generating device according to an embodiment of the present disclosure.

The vibration generating device 200 illustrated in FIG. 4 may be applied by replacing the vibration generating device 200 illustrated in FIG. 3 and may be disposed on a rear surface of a display panel 100 by an adhesive member 150. The vibration generating device 200 will be described with reference to FIG. 4 and a description which is the same as or similar to the vibration generating device 200 of FIG. 3 may be omitted, or only a desired portion will be described.

With reference to FIG. 4, the vibration generating device 200 may include at least two or more vibration generating devices having different frequency characteristics. In according to embodiments of the present disclosure, an example where the vibration generating device includes three vibration generating devices, for example, first to third vibration generating devices 200-1 to 200-3, will be described, but embodiments of the present disclosure are not limited thereto.

The vibration generating device 200 may be implemented in the form of one film type (or a single film type) and may include a piezoelectric composite layer PCL configured in a plurality of regions having different frequency characteristics, a first electrode 230 disposed on a first surface of the piezoelectric composite layer PCL, and a second electrode 240 disposed on a second surface of the piezoelectric composite layer PCL. In an embodiment of the present disclosure, the piezoelectric composite layer PCL may include three piezoelectric composite layers PCL1 to PCL3, but embodiments of the present disclosure are not limited thereto.

According to an embodiment of the present disclosure, the vibration generating device 200 may further include a first protection layer 250 and a second protection layer 260. The first protection layer 250 may be disposed on the first electrode 230. The first protection layer 250 may protect the first surface of the piezoelectric composite layer PCL or the first electrode 230. The second protection layer 260 may be disposed on the second electrode 240. The second protection layer 260 may protect the second surface of the piezoelectric composite layer PCL or the second electrode 240.

According to an embodiment of the present disclosure, the first vibration generating device 200-1 may include a first piezoelectric composite layer PCL1, a first electrode 231 disposed on a first surface of the first piezoelectric composite layer PCL1, and a second electrode 241 disposed on a second surface of the first piezoelectric composite layer PCL1. The second vibration generating device 200-2 may include a second piezoelectric composite layer PCL2, a first electrode 232 disposed on a first surface of the second piezoelectric composite layer PCL2, and a second electrode 242 disposed on a second surface of the second piezoelectric composite layer PCL2. The third vibration generating device 200-3 may include a third piezoelectric composite layer PCL3, a first electrode 233 disposed on a first surface of the third piezoelectric composite layer PCL3, and a second electrode 243 disposed on a second surface of the third piezoelectric composite layer PCL3.

In FIG. 4, it is illustrated that the first electrodes 231 to 233 of the first to third vibration generating devices 200-1 to 200-3 are connected to one another to configure one common first electrode 230, but embodiments of the present disclosure are not limited thereto. For example, the first electrodes 231 to 233 of each of the first to third vibration generating devices 200-1 to 200-3 may be configured independently and divisionally. Also, in FIG. 4, it is illustrated that the second electrodes 241 to 243 of the first to third vibration generating devices 200-1 to 200-3 are connected to one another to configure one common second electrode 240, but embodiments of the present disclosure are not limited thereto. For example, the second electrodes 241 to 243 of each of the first to third vibration generating devices 200-1 to 200-3 may be configured independently and divisionally.

Each of the first to third piezoelectric composite layers PCL1 to PCL3 of the first to third vibration generating devices 200-1 to 200-3 may be configured as the piezoelectric composite layer PCL as described above with reference to FIG. 3. For example, each of the first to third piezoelectric composite layers PCL1 to PCL3 may include a plurality of first portions 210 and a plurality of second portions 220 each disposed between two adjacent first portions 210 of the plurality of first portions 210 and thus, its repetitive description may be omitted.

The first to third vibration generating devices 200-1 to 200-3 may be configured to have different frequency characteristics. The first vibration generating device 200-1 may have one or more (for example, a frequency characteristic of a high-pitched sound band, a frequency characteristic of a middle-high-pitched sound band, or a frequency characteristic of a high-middle-low-pitched sound band) among the frequency characteristic of the high-pitched sound band, a frequency characteristic of a middle-pitched sound band, and a frequency characteristic of a low-pitched sound band. The second vibration generating device 200-2 may have one or more (for example, a frequency characteristic of the middle-pitched sound band, a frequency characteristic of the middle-high-pitched sound band, or a frequency characteristic of the high-middle-low-pitched sound band) different from the frequency characteristics of the first vibration generating device 200-1 among the frequency characteristic of the high-pitched sound band, the frequency characteristic of the middle-pitched sound band, and the frequency characteristic of the low-pitched sound band. The third vibration generating device 200-3 may have one or more (for example, a frequency characteristic of the low-pitched sound band, a frequency characteristic of the middle-low-pitched sound band, or a frequency characteristic of the high-middle-low-pitched sound band) different from the frequency characteristics of the first vibration generating device 200-1 or the frequency characteristics of the second vibration generating device 200-2 among the frequency characteristic of the high-pitched sound band, the frequency characteristic of the middle-pitched sound band, and the frequency characteristic of the low-pitched sound band. However, the embodiments of present disclosure are not limited thereto. The frequency of the high-pitched sound band may be about 10 kHz to about 20 kHz, the frequency of the middle-pitched sound band may be about 200 Hz to about 10 kHz, and the frequency of the low-pitched sound band may be about 200 Hz or less, but embodiments of the present disclosure are not limited thereto. For example, the first vibration generating device 200-1 may be a tweeter or a receiver, the second vibration generating device 200-2 may be a speaker or a sound generating device, and the third vibration generating device 200-3 may be a haptic or a haptic device, but embodiments of the present disclosure are not limited thereto. As another example, the first vibration generating device 200-1 may be a tweeter or a receiver, the second vibration generating device 200-2 may be a haptic or a haptic device, and the third vibration generating device 200-3 may be a speaker or a sound generating device, but embodiments of the present disclosure are not limited thereto. A configuration of the vibration generating devices are not limited thereto.

According to an embodiment of the present disclosure, at least one or more among the first to third vibration generating devices 200-1 to 200-3 may be an image sensor. In a vibration generating device driven as an image sensor, Young's modulus (or an elastic modulus) of a second portion of a piezoelectric composite layer for sensors may be lower than a second portion of another vibration generating device, so that a signal oscillated by the piezoelectric composite layer for sensors and a signal received by the piezoelectric composite layer for sensors are quickly attenuated not to overlap. The second portion of the piezoelectric composite layer for sensors may include a material which is high in vibration attenuation effect (or damping characteristic). For example, the second portion may be Young's modulus of about 0.1 Gpa to about 2.5 Gpa. For example, the second portion of the piezoelectric composite layer for sensors may include a urethane-based polymer, an acryl-based polymer, or a polyvinylidene fluoride (PVDF)-based polymer, but embodiments of the present disclosure are not limited thereto.

To implement the first to third vibration generating devices 200-1 to 200-3 having different frequency characteristics by one piezoelectric composite layer PCL configuring the vibration generating device 200, the second portions 220 of the first to third piezoelectric composite layers PCL1 to PCL3 may include materials having different expansion coefficients.

An expansion coefficient may be a ratio of compression deformation rate to tension deformation rate, and as an expansion coefficient increases, a frequency of the high-pitched sound band may be output. For example, an expansion coefficient may be a ratio of compression deformation rate in a widthwise direction (or a transverse direction) to tension deformation rate in a lengthwise direction (or a longitudinal direction). For example, the second portion 220 may be configured as an auxetic layer (or an auxetic structure). The second portion 220 may include a material having a negative or zero expansion coefficient and may realize a strong vibration or sound, and for example, may have an expansion coefficient of about −0.3 to about 0.

To implement the first to third vibration generating devices 200-1 to 200-3 having different frequency characteristics by one piezoelectric composite layer PCL configuring the vibration generating device 200, a width(s) of the first portion 210 and/or the second portion 220 of each of the first to third piezoelectric composite layers PCL1 to PCL3 may be configured differently. For example, a width of the first portion 210 of the first piezoelectric composite layer PCL1, a width of the first portion 210 of the second piezoelectric composite layer PCL2, and a width of the first portion 210 of the third piezoelectric composite layer PCL3 may be different to each other. For example, a width of the second portion 220 of the first piezoelectric composite layer PCL1, a width of the second portion 220 of the second piezoelectric composite layer PCL2, and a width of the second portion 220 of the third piezoelectric composite layer PCL3 may be different to each other.

Therefore, the vibration generating device 200 may implement the first to third vibration generating devices 200-1 to 200-3 having different frequency characteristics by the piezoelectric composite layer PCL formed of one layer, and thus, may not increase a thickness of the display apparatus 10, and a sound characteristic or a vibration characteristic thereof may be enhanced.

Figure 5:
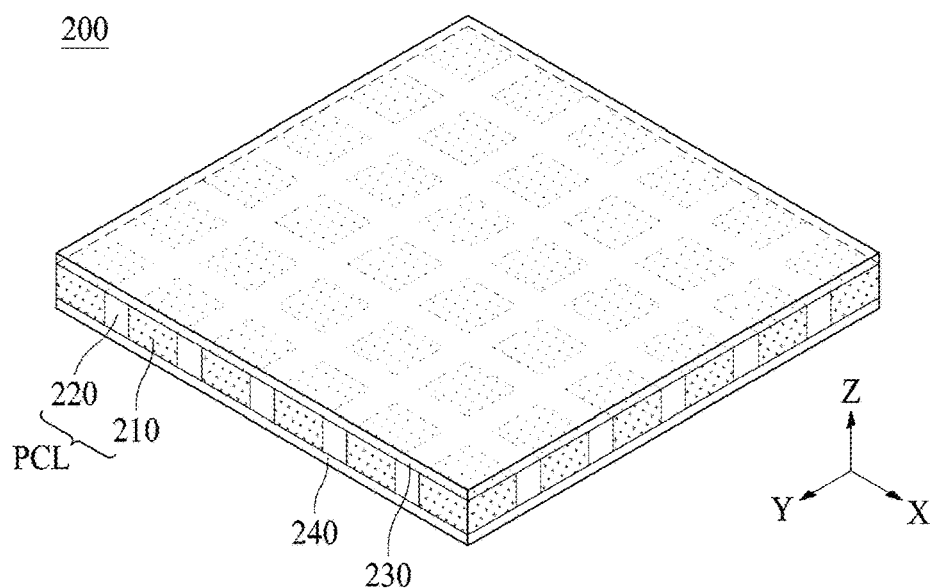
FIG. 5 illustrates a vibration generating device according to another embodiment of the present disclosure.

FIG. 5 illustrates a vibration generating device according to another embodiment of the present disclosure, and illustrates an embodiment where the piezoelectric composite layer described above with reference to FIG. 3 is modified. Hereinafter, therefore, repetitive descriptions of elements other than the piezoelectric composite layer and elements relevant thereto may be omitted or will be briefly given.

With reference to FIG. 5, in the vibration generating device 200 in illustrated in FIG. 5, the piezoelectric composite layer PCL may include a plurality of first portions 210, which are spaced apart from one another along a first direction X and a second direction Y, and a second portion 220 disposed between the plurality of first portions 210.

The plurality of first portions 210 may be disposed to be spaced apart from one another along the first direction X and the second direction Y. For example, each of the plurality of first portions 210 may have a hexahedral shape having the same size and may be disposed in a lattice shape. Each of the plurality of first portions 210 may form substantially the same piezoelectric material as that of the first portions 210 described above with reference to FIG. 3, and thus, like reference numerals refer to like elements and their repetitive descriptions may be omitted.

The second portion 220 may be disposed between the plurality of first portions 210 along each of the first direction X and the second direction Y. The second portion 220 may be configured to fill a gap or a space between two adjacent first portions 210 or to surround each of the plurality of first portions 210, and thus, may be connected to or attached on an adjacent first portion 210. According to an embodiment of the present disclosure, a width of a second portion 220 disposed between two first portions 210 adjacent to each other along the first direction X may be the same as or different from that of the first portion 210, and a width of a second portion 220 disposed between two first portions 210 adjacent to each other along the second direction Y may be the same as or different from that of the first portion 210. The second portion 220 may form substantially the same organic material as that of the second portion 220 described above with reference to FIG. 3, and thus, like reference numerals refer to like elements and their repetitive descriptions may be omitted.

Therefore, the piezoelectric composite layer PCL of the vibration generating device 200 according to an embodiment of the present disclosure may include a 1-3 composite and thus may have a resonance frequency of 30 MHz or less, but embodiments of the present disclosure are not limited thereto. For example, a resonance frequency of the piezoelectric composite layer PCL may vary based on one or more of a shape, a length, and a thickness.

Figure 6:
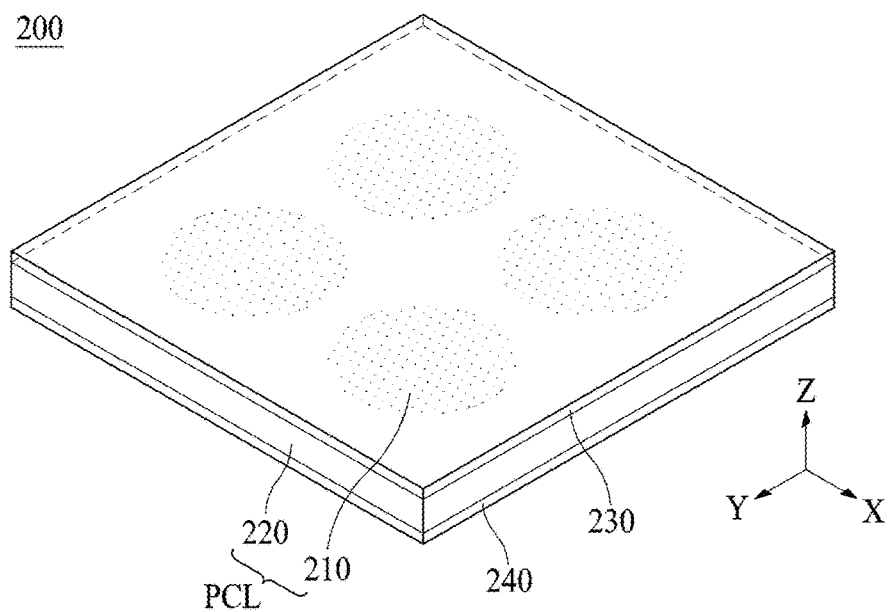
FIG. 6 illustrates a vibration generating device according to another embodiment of the present disclosure.

FIG. 6 illustrates a vibration generating device according to another embodiment of the present disclosure, and illustrates an embodiment where the piezoelectric composite layer illustrated in FIG. 3 is modified. Hereinafter, therefore, repetitive descriptions of elements other than the piezoelectric composite layer and elements relevant thereto may be omitted or will be briefly given.

With reference to FIG. 6, in the vibration generating device 200 in illustrated in FIG. 6, the piezoelectric composite layer PCL may include a plurality of first portions 210, which are spaced apart from one another along a first direction X and a second direction Y, and a second portion 220 disposed between the plurality of first portions 210.

Each of the plurality of first portions 210 according to an embodiment of the present disclosure may have a plane structure of a circular shape. For example, each of the plurality of first portions 210 may have a circular plate shape, but embodiments of the present disclosure are not limited thereto. For example, each of the plurality of first portions 210 may have a dot shape including an oval shape, a polygonal shape, or a donut shape.

The second portion 220 may be disposed between the plurality of first portions 210 along each of the first direction X and the second direction Y. The second portion 220 may be configured to surround each of the plurality of first portions 210, and thus, may be connected to or attached on a side surface of the each of the plurality of first portions 210. Each of the plurality of first portions 210 and the second portion 220 may be disposed (or arranged) in parallel on the same plane (or the same layer).

In the piezoelectric composite layer PCL of the vibration generating device 200 according to another embodiment of the present disclosure, each of the plurality of first portions 210 may have a flat structure of a triangular shape instead of a plane structure of a circular shape. For example, each of the plurality of first portions 210 may have a triangular plate shape.

According to an embodiment of the present disclosure, four adjacent first portions 210 among the plurality of first portions 210 may be adjacent to one another to form a tetragonal or quadrilateral shape (or a square shape). Vertices of the four adjacent first portions 210 forming a tetragonal shape may be adjacent to one another in a center portion (or a central portion) of the tetragonal shape.

According to another embodiment of the present disclosure, six adjacent first portions 210 among the plurality of first portions 210 may be adjacent to one another to form a hexagonal shape (or a regularly hexagonal shape). Vertices of the six adjacent first portions 210 forming a hexagonal shape may be adjacent to one another in a center portion (or a central portion) of the hexagonal shape.

Figure 7:
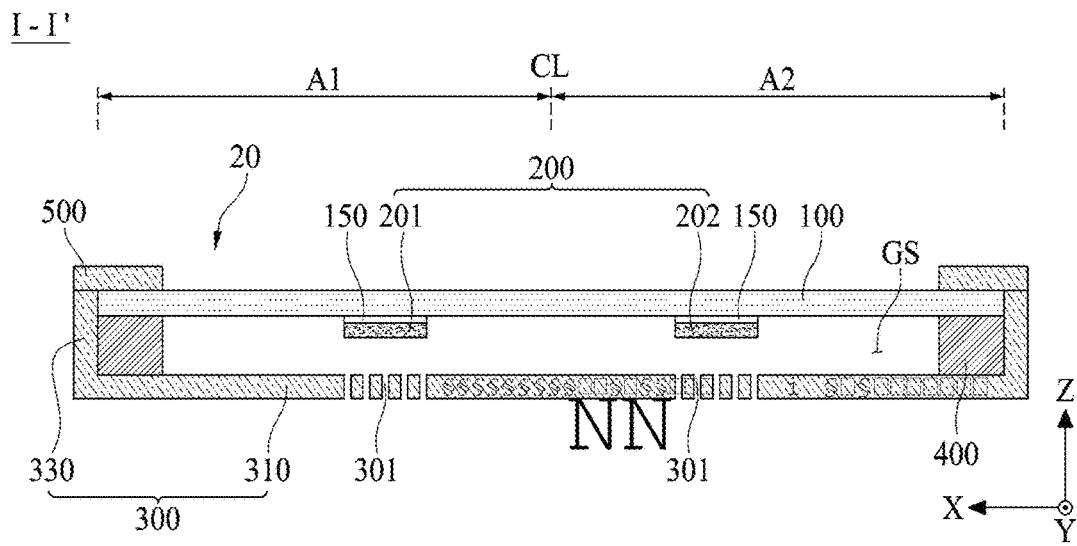
FIG. 7 is a cross-sectional view taken along line I-I' illustrated in FIG. 1 in the display apparatus according to another embodiment of the present disclosure.

FIG. 7 is another cross-sectional view taken along line I-I' illustrated in FIG. 1 in a display apparatus according to an embodiment of the present disclosure and illustrates an embodiment where the vibration generating device in the display apparatus illustrated in FIG. 2 is modified. Hereinafter, therefore, repetitive descriptions of elements other than a vibration generating device and elements relevant thereto are omitted or will be briefly given.

In the display apparatus 20 of FIG. 7, a rear surface of a display panel 100 may be divided into a first region A1 and a second region A2. In FIG. 7, it is illustrated that the rear surface of the display panel 100 is divided into two regions A1 and A2, but embodiments of present disclosure are not limited thereto. For example, the rear surface of the display panel 100 may be divided into three or more regions. For example, with respect to a first direction X, the first and second regions A1 and A2 may be laterally symmetrical with a center line CL of the display panel 100, but embodiments of present disclosure are not limited thereto. For example, each of the first and second regions A1 and A2 may overlap a display area AA of the display panel 100. As another embodiment of present disclosure, when the rear surface of the display panel 100 may be divided into three or more regions, each of the regions may overlap the display area AA.

A vibration generating device 200 according to an embodiment of the present disclosure may include at least one or more first vibration generating device 201 and at least one or more second vibration generating device 202. The first vibration generating device 201 may be disposed at the first region A1 of the display panel 100, and the second vibration generating device 202 may be disposed at the second region A2 of the display panel 100. Also, a first hole 301 disposed at the supporting member 300 may be disposed to correspond to the first vibration generating device 201 and the second vibration generating device 202.

For example, the first hole 301 may be disposed to correspond to a whole region of the first vibration generating device 201 and the second vibration generating device 202. According to an embodiment of the present disclosure, the first hole 301 may be disposed along a portion of the first vibration generating device 201, for example, a periphery of the first vibration generating device 201, and a portion of the second vibration generating device 202, for example, a periphery of the second vibration generating device 202. According to an embodiment of the present disclosure, when the display panel 100 is divided into three or more regions, at least one or more vibration generating device may be disposed at each of the three or more divided regions, and the first hole 301 may be disposed to correspond to a vibration generating device disposed at each of the three or more divided regions.

For example, the first vibration generating device 201 may be disposed close to a center portion or a periphery in the first region A1 of the display panel 100, with respect to the first direction X or the second direction Y. The second vibration generating device 202 may be disposed close to a center portion or a periphery in the second region A2 of the display panel 100, with respect to the first direction X or the second direction Y.

The first vibration generating device 201 may directly vibrate the first region A1 of the display panel 100, and thus, may generate a first sound (or a first panel vibration sound) or a first haptic feedback in the first region A1 of the display panel 100. The second vibration generating device 202 may directly vibrate the second region A2 of the display panel 100, and thus, may generate a second sound (or a second panel vibration sound) or a second haptic feedback in the second region A2 of the display panel 100.

For example, the first sound may be a left sound, and the second sound may be a right sound. A size of each of the first vibration generating device 201 and the second vibration generating device 202 according to an embodiment of the present disclosure may have various sizes based on a sound characteristic needed for the display apparatus, and for example, may have a size which is less than or equal to half of a size of each of the first and second regions A1 and A2 or may have a size which is greater than or equal to half of the size of each of the first and second regions A1 and A2. According to an embodiment of the present disclosure, the first vibration generating device 201 and the second vibration generating device 202 may have the same size or different sizes based on the left and right sound characteristics of the display apparatus and a sound characteristic or a stereo sound characteristic of the display apparatus and may be disposed at a left-right symmetrical or asymmetrical structure with respect to the center line CL of the display panel 100.

Each of the first vibration generating device 201 and the second vibration generating device 202 may be connected or attached at the rear surface of the display panel 100 by an adhesive member 150. The adhesive member 150 according to an embodiment of the present disclosure may be interposed between the rear surface of the display panel 100 and each of the first vibration generating device 201 and the second vibration generating device 202.

As described above, the display apparatus 20 according to another embodiment of the present disclosure may output a left sound and a right sound in a forward direction of the display panel 100 through the first vibration generating device 201 and the second vibration generating device 202, thereby providing a sound or a stereo sound to a user.

Figure 8:
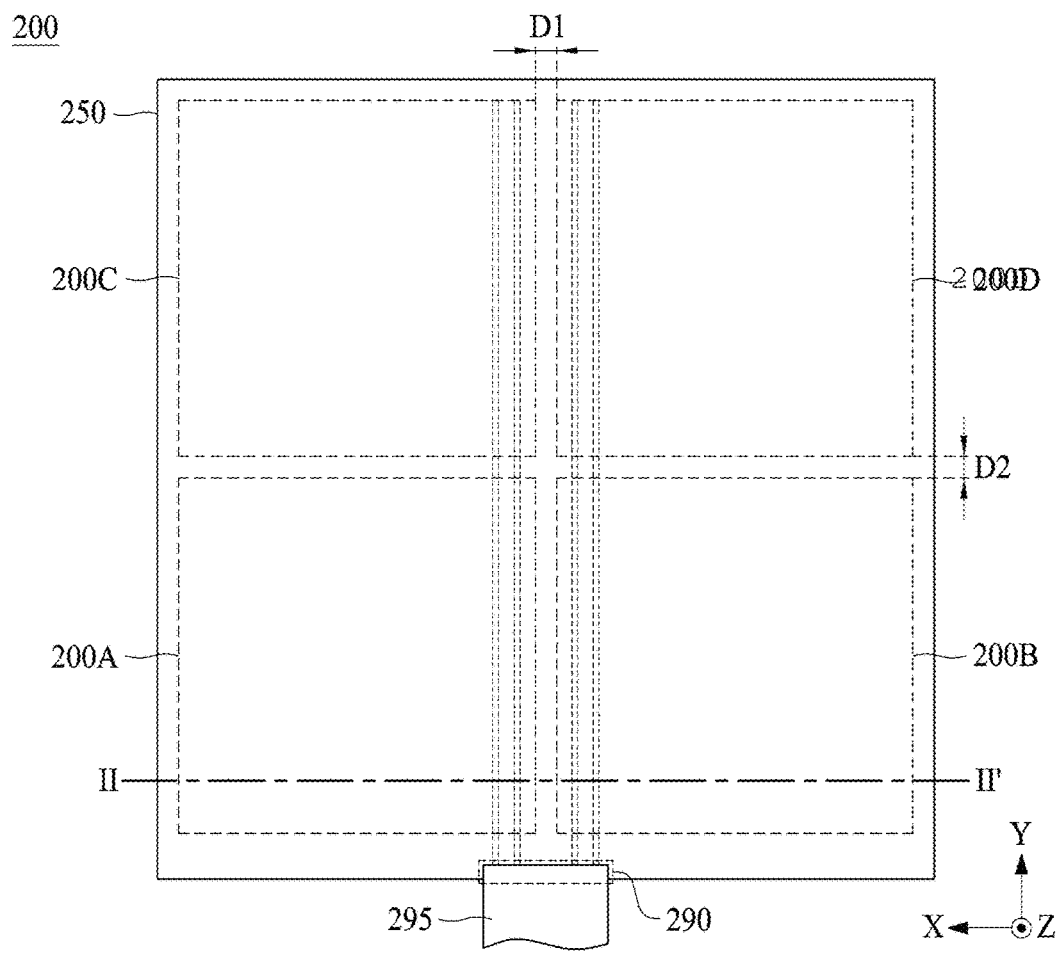
FIG. 8 illustrates a vibration generating device according to another embodiment of the present disclosure.
Figure 9:
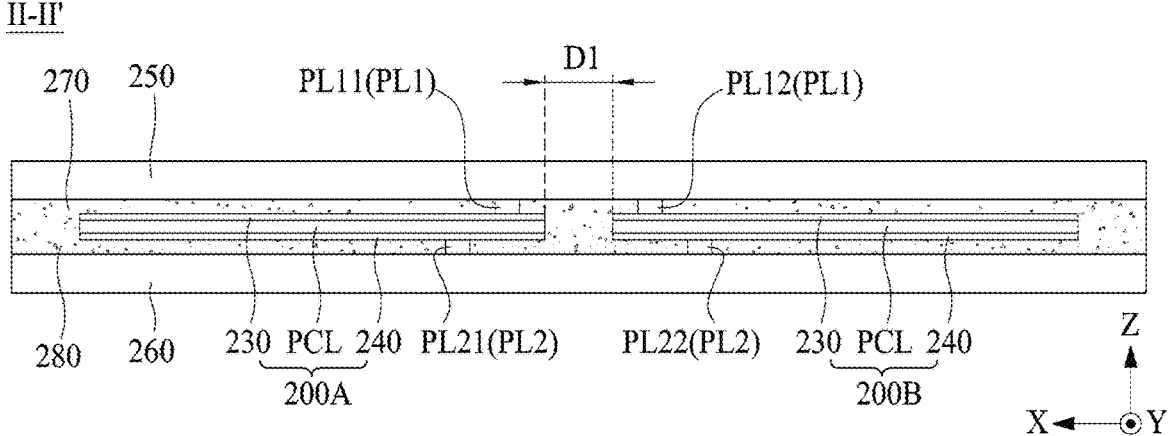
FIG. 9 is a cross-sectional view taken along line II-II' illustrated in FIG. 8.

FIG. 8 illustrates a vibration generating device according to an embodiment of the present disclosure. FIG. 9 is a cross-sectional view taken along line II-II' illustrated in FIG. 8.

With reference to FIGS. 8 and 9, the vibration generating device 200 according to an embodiment of the present disclosure may include at least one or more vibration generating device 200A to 200D or a plurality of vibration generating devices 200A to 200D.

Each of the plurality of vibration generating devices 200A to 200D may be electrically separated and disposed while being spaced apart from each other along each of a first direction X and a second direction Y intersecting with the first direction X.

Each of the plurality of vibration devices 200A to 200D may alternately and/or repeatedly contract and expand based on a piezoelectric effect to vibrate. For example, each of the plurality of vibration devices 200A to 200D may be arranged or tiled at a certain interval (or distance) along each of the first direction X and the second direction Y. For example, the vibration generating device 200 in which the plurality of vibration devices 200A to 200D are arranged or tiled may be referred to as a vibration array, a vibration array portion, a vibration device array portion, a vibration array structure, a tiling vibration array, a tiling vibration array device, a tiling vibration array module, or a tiling vibration film, but embodiments of the present disclosure are not limited thereto.

Each of the plurality of vibration generating devices 200A to 200D according to an embodiment of the present disclosure may have a tetragonal shape. For example, each of the plurality of vibration generating devices 200A to 200D may have a tetragonal shape having a width of about 5 cm or more. For example, each of the plurality of vibration generating devices 200A to 200D may have a square shape having a size of 5 cm×5 cm or more, but embodiments of the present disclosure are not limited thereto.

Each of the plurality of vibration generating devices 200A to 200D may be arranged or tiled in i×j form on the same plane, and thus, vibration generating device 200 may have an enlarged area based on tiling of the plurality of vibration generating devices 200A to 200D having a relatively small size. For example, i may be the number of the vibration generating devices arranged along the first direction X or may be a natural number of 2 or more, and j may be the number of the vibration generating devices arranged along the second direction Y or may be a natural number of 1 or more which is the same as or different from i.

The plurality of vibration generating devices 210A to 210D may be arranged or tiled at a certain interval (or distance), and thus, may be implemented as one vibration device (or a single vibration device) which is driven as one complete single-body without being independently driven.

According to an embodiment of the present disclosure, with respect to the first direction X, a first separation distance (or first distance or first interval) D1 between the plurality of vibration generating devices 210A to 210D may be 0.1 mm or more and less than 3 cm, but embodiments of the present disclosure are not limited thereto. Also, with respect to the second direction Y, a second separation distance (or second distance or second interval) D2 between the plurality of vibration generating devices 210A to 210D may be 0.1 mm or more and less than 3 cm, but embodiments of the present disclosure are not limited thereto. For example, the first separation distance D1 may be the same as the second separation distance D2. For example, the first separation distance D1 may be the same as the second separation distance D2 within a process error range.

According to an embodiment of the present disclosure, each of the plurality of vibration generating devices 210A to 210D may be arranged or tiled to have the separation distances (or intervals) D1 and D2 of 0.1 mm or more and less than 3 cm, and thus, may be driven as one vibration device, thereby increasing a reproduction band of a sound and a sound pressure level characteristic of a sound which is generated based on a single-body vibration of the plurality of vibration generating devices 210A to 210D. For example, the plurality of vibration generating devices 210A to 210D may be arranged at an interval of 0.1 mm or more and less than 5 mm, to increase a reproduction band of a sound generated based on a single-body vibration of the plurality of vibration generating devices 210A to 210D and to increase a sound of a low-pitched sound band, for example, a sound pressure level characteristic in 500 Hz or less.

According to an embodiment of the present disclosure, when the plurality of vibration generating devices 210A to 210D are arranged at the intervals D1 and D2 of less than 0.1 mm or without the intervals D1 and D2, the reliability of the vibration generating devices 210A to 210D or the vibration generating devices 210 may be reduced due to damage or a crack caused by a physical contact therebetween which occurs when each of the vibration generating devices 210A to 210D vibrates.

According to an embodiment of the present disclosure, when the plurality of vibration generating devices 210A to 210D are arranged at the intervals D1 and D2 of 3 cm or more, the plurality of vibration generating devices 210A to 210D may not be driven as one vibration device due to an independent vibration of each of the plurality of vibration generating devices 210A to 210D. Therefore, a reproduction band of a sound and a sound pressure level characteristic of a sound which is generated based on vibrations of the plurality of vibration generating devices 210A to 210D may be reduced. For example, when the plurality of vibration generating devices 210A to 210D are arranged at the intervals D1 and D2 of 3 cm or more, a sound characteristic and a sound pressure level characteristic of the low-pitched sound band, for example, in 500 Hz or less may each be reduced.

According to an embodiment of the present disclosure, when the plurality of vibration generating devices 210A to 210D are arranged at an interval of 5 mm, each of the plurality of vibration generating devices 210A to 210D may not be perfectly driven as one vibration device, and thus, a sound characteristic and a sound pressure level characteristic of the low-pitched sound band, for example, in 200 Hz or less, may each be reduced.

According to another embodiment of the present disclosure, when the plurality of vibration generating devices 210A to 210D are arranged at an interval of 1 mm, each of the plurality of vibration generating devices 210A to 210D may be driven as one vibration device, and thus, a reproduction band of a sound may increase and a sound of the low-pitched sound band (for example, a sound pressure level characteristic in 500 Hz or less) may increase. For example, when the plurality of vibration generating devices 210A to 210D are arranged at an interval of 1 mm, the vibration generating device 200 may be implemented as a large-area vibrator which is enlarged based on optimization of a separation distance between the plurality of vibration generating devices 210A to 210D. Therefore, the vibration generating device 200 may be driven as a large-area vibrator based on a single-body vibration of the plurality of vibration generating devices 210A to 210D, and thus, a sound characteristic and a sound pressure level characteristic may each increase in the low-pitched sound band and a reproduction band of a sound generated based on a large-area vibration of the vibration generating device 200.

Therefore, to implement a single-body vibration (or one vibration device) of the plurality of vibration generating devices 210A to 210D, a separation distance between the plurality of vibration generating devices 210A to 210D may be adjusted to 0.1 mm or more and less than 3 cm. Also, to implement a single-body vibration (or one vibration device) of the plurality of vibration generating devices 210A to 210D and to increase a sound pressure level characteristic of a sound of the low-pitched sound band, the separation distance between the plurality of vibration generating devices 210A to 210D may be adjusted to 0.1 mm or more and less than 5 mm.

The vibration generating device 200 according to an embodiment of the present disclosure may include first to fourth vibration generating devices 210A to 210D which are electrically disconnected (or separated) and/or structurally separated from one another and are disposed apart from one another along each of the first direction X and the second direction Y. For example, the first to fourth vibration generating devices 210A to 210D may be arranged or tiled in 2×2 form.

According to an embodiment of the present disclosure, the first and second vibration generating devices 210A and 210B may be spaced apart from each other along the first direction X. The third and fourth vibration generating devices 210C and 210D may be spaced apart from each other along the first direction X and may be spaced apart from each of the first and second vibration generating devices 210A and 210B along the second direction Y. The first and third vibration generating devices 210A and 210C may be spaced apart from each other along the second direction Y to face each other. The second and fourth vibration generating devices 210B and 210D may be spaced apart from each other along the second direction Y to face each other.

According to an embodiment of the present disclosure, the first to fourth vibration generating devices 210A to 210D may be arranged (or tiled) at the intervals D1 and D2 of 0.1 mm or more and less than 3 cm or may be arranged (or tiled) at 0.1 mm or more and less than 5 mm along each of the first direction X and the second direction Y, so that the first to fourth vibration generating devices 210A to 210D are driven as one vibration device or a single-body vibration device, or a large-area vibrator of the vibration generating device 200.

Each of the first to fourth vibration generating devices 210A to 210D according to an embodiment of the present disclosure may include a piezoelectric composite PCL, a first electrode 230, and a second electrode 240.

The piezoelectric composite PCL may include a ceramic-based material capable of realizing a relatively high vibration. For example, the piezoelectric composite PCL may include a 1-3 composite having a piezoelectric characteristic of a 1-3 vibration mode or a 2-2 composite having a piezoelectric characteristic of a 2-2 vibration mode. For example, the piezoelectric composite PCL may include first portions 210 and second portion 220 in the same manner as the piezoelectric composite PCL described above with reference to FIGS. 3 to 6, and thus, like reference numerals refer to like elements and their repetitive descriptions may be omitted.

The first electrode 230 may be disposed at a first surface of the piezoelectric composite PCL and may be electrically connected to the first surface of the piezoelectric composite PCL. The first electrode 230 may be the same as the first electrode 230 described above with reference to FIGS. 3 to 6, and thus, like reference numerals refer to like elements and their repetitive descriptions may be omitted.

The second electrode 240 may be disposed at a second surface of the piezoelectric composite PCL and may be electrically connected to the second surface of the piezoelectric composite PCL. The second electrode 240 may be the same as the second electrode 240 described above with reference to FIGS. 3 to 6, and thus, like reference numerals refer to like elements and their repetitive descriptions may be omitted.

According to an embodiment of the present disclosure, the piezoelectric composite PCL may be formed of a transparent piezoelectric, a semitransparent (or translucent) piezoelectric, or an opaque piezoelectric material, and may be a transparent, a semitransparent or an opaque. Thus, the vibration generating device 200 according to an embodiment of the present disclosure may include the piezoelectric composite PCL having a transparent, a semitransparent or an opaque according to the transparency of an object (or vibration object) being attached or coupled.

The vibration generating device 200 according to an embodiment of the present disclosure may further include a first protection layer 250 and a second protection layer 260.

The first protection layer 250 may be disposed on the first surface of the vibration generating devices 200A to 200D. For example, the first protection layer 250 may cover the first electrode 230 disposed at the first surface of each of the plurality of vibration generating devices 200A to 200D, and thus, may be connected to the first surface of each of the plurality of vibration generating devices 210A to 210D in common or may support the first surface of each of the plurality of vibration generating devices 210A to 210D in common. Accordingly, the first protection layer 250 may protect the first surface of each of the plurality of vibration generating devices 210A to 210D or the first electrode 230.

The first protection layer 250 according to an embodiment of the present disclosure may be disposed at the first surface of each of the plurality of vibration generating devices 210A to 210D by a first adhesive layer 270. For example, the first protection layer 250 may be directly disposed at the first surface of each of the plurality of vibration generating devices 210A to 210D by a film laminating process using the first adhesive layer 270. Accordingly, each of the plurality of vibration generating devices 210A to 210D may be integrated (or disposed) or tiled with the first protection layer 250 to have the certain intervals D1 and D2.

The second protection layer 260 may be disposed at the second surface of the vibration generating devices 200A to 200D. For example, the second protection layer 260 may cover the second electrode 240 disposed at the second surface of each of the plurality of vibration generating devices 200A to 200D, and thus, may be connected to the second surface of each of the plurality of vibration generating devices 210A to 210D in common or may support the second surface of each of the plurality of vibration generating devices 210A to 210D in common. Accordingly, the second protection layer 260 may protect the second surface of each of the plurality of vibration generating devices 210A to 210D or the second electrode 240.

The second protection layer 260 according to an embodiment of the present disclosure may be disposed at the second surface of each of the plurality of vibration generating devices 210A to 210D by a second adhesive layer 280. For example, the second protection layer 260 may be directly disposed at the second surface of each of the plurality of vibration generating devices 210A to 210D by a film laminating process using the second adhesive layer 280. Accordingly, each of the plurality of vibration generating devices 210A to 210D may be integrated (or disposed) or tiled with the second protection layer 260 to have the certain intervals D1 and D2.

Each of the first protection layer 250 and the second protection layer 260 according to an embodiment of the present disclosure may include a plastic material, a fiber material, or a wood material. At least one of the first and second protective layers 250 and 260 may be attached or coupled to an object (or vibration object) of various materials (plastic, glass, wood, metal, etc.) by an adhesive member.

The first adhesive layer 270 may be disposed at the first surface of each of the plurality of vibration generating devices 210A to 210D, and between the plurality of vibration generating devices 210A to 210D. For example, the first adhesive layer 270 may be formed at a rear surface (or an inner surface) of the first protection layer 250 facing the first surface of the vibration generating device 200, disposed at the first surface of each of the plurality of vibration generating devices 210A to 210D, and filled between the plurality of vibration generating devices 210A to 210D.

The second adhesive layer 278 may be disposed at the second surface of each of the plurality of vibration generating devices 210A to 210D, and between the plurality of vibration generating devices 210A to 210D. For example, the second adhesive layer 280 may be formed at a front surface (or an inner surface) of the second protection layer 260 facing the second surface of the vibration generating device 200, disposed at the second surface of each of the plurality of vibration generating devices 210A to 210D, and filled between the plurality of vibration generating devices 210A to 210D.

The first and second adhesive layers 270 and 280 may be coupled or connected to each other between the plurality of vibration generating devices 210A to 210D. Therefore, each of the plurality of vibration generating devices 210A to 210D may be surrounded by the first and second adhesive layers 270 and 280. For example, the first and second adhesive layers 270 and 280 may entirely surround the whole plurality of vibration generating devices 210A to 210D. For example, the plurality of vibration generating devices 210A to 210D may be embedded between the first and second adhesive layers 270 and 280. For example, the first and second adhesive layers 270 and 280 may be referred to as a cover member, but embodiments of the present disclosure are not limited thereto. When each of the first and second adhesive layers 270 and 280 is a cover member, the first protection layer 250 may be disposed at a first surface of the cover member, and the second protection layer 260 may be disposed at a second surface of the cover member.

Each of the first and second adhesive layers 270 and 280 according to an embodiment of the present disclosure may include an electric insulating material which has adhesiveness and is capable of compression and decompression. For example, each of the first and second adhesive layers 270 and 280 may include an epoxy resin, an acryl resin, a silicone resin, or a urethane resin, but embodiments of the present disclosure are not limited thereto. For example, each of the first and second adhesive layers 270 and 280 may be configured to be transparent, translucent, or opaque according to the position where the vibration generating device 200 is disposed.

The vibration generating device 200 according to an embodiment of the present disclosure may further include a first power supply line PL1 disposed at the first protection layer 250, a second power supply line PL2 disposed at the second protection layer 260, and a pad part 290 electrically connected to the first power supply line PL1 and the second power supply line PL2.

The first power supply line PL1 may be disposed at a rear surface of the first protection layer 250 facing the first surface of the vibration generating device 200. The first power supply line PL1 may be electrically connected to the first electrode 230 of each of the plurality of vibration generating devices 210A to 210D. For example, the first power supply line PL1 may be directly and electrically connected to the first electrode 230 of each of the plurality of vibration generating devices 210A to 210D. For example, the first power supply line PL1 may be electrically connected to the first electrode 230 of each of the plurality of vibration generating devices 210A to 210D by an anisotropic conductive film. As another example of the present disclosure, the first power supply line PL1 may be electrically connected to the first electrode 230 of each of the plurality of vibration generating devices 210A to 210D by a conductive material (or particle) included in the first adhesive layer 270.

The first power supply line PL1 according to an embodiment of the present disclosure may include first and second upper power lines PL11 and PL12 disposed along a second direction Y. For example, the first upper power line PL11 may be electrically connected to the first electrode 230 of each of the first and third vibration generating devices 210A and 210C (or a first vibration generating group or a first group) arranged at a first column parallel to the second direction Y among the plurality of vibration generating devices 210A to 210D. The second upper power line PL12 may be electrically connected to the first electrode 230 of each of the second and fourth vibration generating devices 210B and 210D (or a second vibration generating group or a second group) arranged at a second column parallel to the second direction Y among the plurality of vibration generating devices 210A to 210D.

The second power supply line PL2 may be disposed at a front surface of the second protection layer 260 facing the second surface of the vibration generating device 200. The second power supply line PL2 may be electrically connected to the second electrode 240 of each of the plurality of vibration generating devices 210A to 210D. For example, the second power supply line PL2 may be directly and electrically connected to the second electrode 240 of each of the plurality of vibration generating devices 210A to 210D. For example, the second power supply line PL2 may be electrically connected to the second electrode 240 of each of the plurality of vibration generating devices 210A to 210D by an anisotropic conductive film. As another example, the second power supply line PL2 may be electrically connected to the second electrode 240 of each of the plurality of vibration generating devices 210A to 210D by a conductive material (or particle) included in the second adhesive layer 280.

The second power supply line PL2 according to an embodiment of the present disclosure may include first and second lower power lines PL21 and PL22 disposed along a second direction Y. For example, the first lower power line PL21 may be electrically connected to the second electrode 240 of each of the first and third vibration generating devices 210A and 210C (or a first vibration generating group or a first group) arranged at a first column parallel to the second direction Y among the plurality of vibration generating devices 210A to 210D. The second lower power line PL22 may be electrically connected to the second electrode 240 of each of the second and fourth vibration generating devices 210B and 210D (or a second vibration generating group or a second group) arranged at a second column parallel to the second direction Y among the plurality of vibration generating devices 210A to 210D.

The pad part 290 may be disposed at the vibration generating device 200 so as to be electrically connected to one portion (or one end or one side) of each of the first power supply line PL1 and the second power supply line PL2. The pad part 290 according to an embodiment of the present disclosure may include a first pad electrode electrically connected to one portion of the first power supply line PL1 and a second pad electrode electrically connected to one portion of the second power supply line PL2.

The first pad electrode may be connected to one portion of each of the first and second upper power lines PL11 and PL12 of the first power supply line PL1. For example, the one portion of each of the first and second upper power lines PL11 and PL12 may branch from the first pad electrode.

The second pad electrode may be connected to one portion of each of the first and second lower power lines PL21 and PL22 of the second power supply line PL2. For example, the one portion of each of the first and second lower power lines PL21 and PL22 may branch from the second pad electrode.

According to an embodiment of the present disclosure, each of the first power supply line PL1, the second power supply line PL2, and the pad part 290 may be configured to be a transparent conductive material, a translucent conductive material, or an opaque conductive material so as to be transparent, translucent, or opaque.

The vibration generating device 200 according to an embodiment of the present disclosure may further include a flexible cable 295.

The flexible cable 295 may be electrically connected to the pad part 290 disposed at the vibration generating device 200 and may supply the vibration generating device 200 with a vibration driving signal (or a sound signal) provided from a sound processing circuit. The flexible cable 295 according to an embodiment of the present disclosure may include a first terminal electrically connected to the first pad electrode of the pad part 290 and a second terminal electrically connected to the second pad electrode of the pad part 290. For example, the flexible cable 295 may be a flexible printed circuit cable or a flexible flat cable, but embodiments of the present disclosure are not limited thereto.

The sound processing circuit may generate an alternating current (AC) vibration driving signal including a first vibration driving signal and a second vibration driving signal based on a sound source. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode 230 of each of the plurality of vibration generating devices 210A to 210D through a first terminal of the flexible cable 295, the first pad electrode of the pad part 290, and the first power supply line PL1. The second vibration driving signal may be supplied to the second electrode 240 of each of the plurality of vibration generating devices 210A to 210D through a second terminal of the flexible cable 295, the second pad electrode of the pad part 290, and the second power supply line PL2.

According to an embodiment of the present disclosure, the flexible cable 295 may be configured to be transparent, translucent, or opaque.

Therefore, the vibration generating device 200 according to an embodiment of the present disclosure may include the plurality of vibration generating devices 210A to 210D which are arranged or tiled at a certain interval so as to be implemented as a single vibrator without being independently driven, and thus, may be driven as a large-area vibrator based on a single-body vibration of the plurality of vibration generating devices 210A to 210D. Accordingly, the vibration generating device 200 according to an embodiment of the present disclosure may vibrate a large area or vibrate by itself in a large-area, thereby increasing or enhancing each of a sound characteristic and a sound pressure level characteristic in the low-pitched sound band and a reproduction band of a sound output to a space.

Figure 10A:
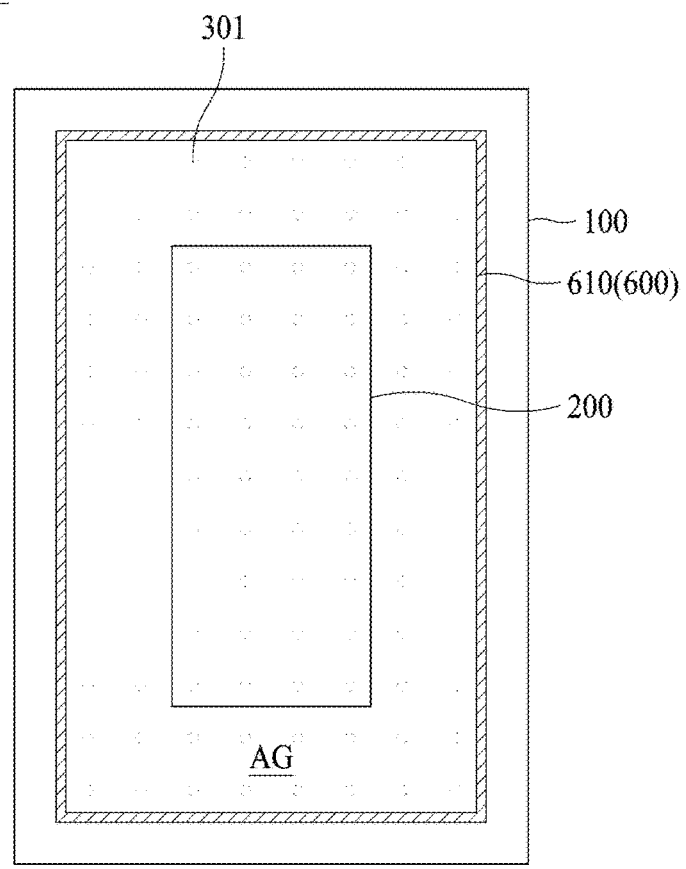
FIG. 10A illustrates a display apparatus according to another embodiment of the present disclosure.
Figure 10B:
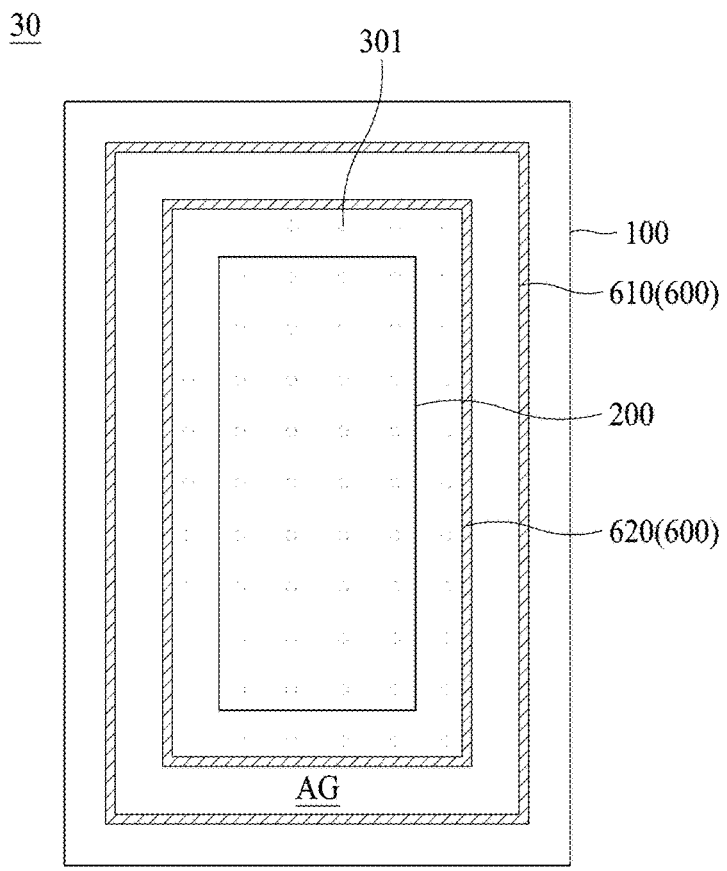
FIG. 10B illustrates a display apparatus according to another embodiment of the present disclosure.
Figure 11:
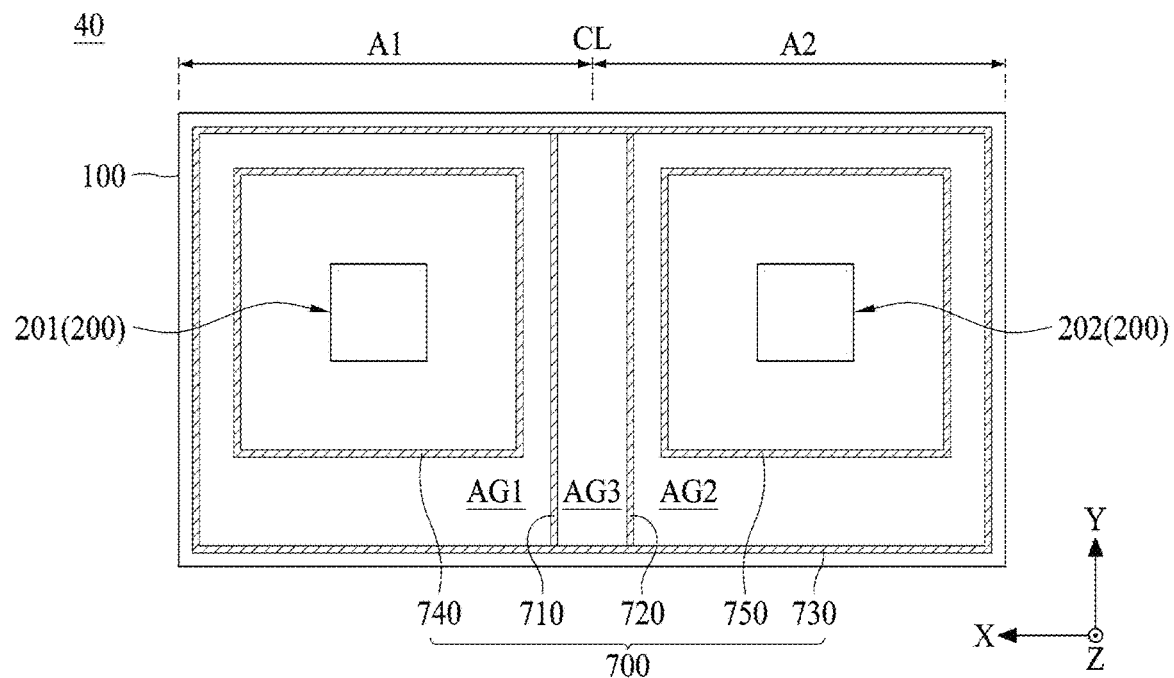
FIG. 11 illustrates a display apparatus according to another embodiment of the present disclosure.

FIGS. 10A to 11 illustrate a display apparatus according to another embodiment of the present disclosure.

The display apparatus 30 illustrated in FIGS. 10A and 10B may be implemented by adding a partition 600 to the display apparatus 10 of FIG. 1. Hereinafter, therefore, repetitive descriptions of elements other than a partition and elements relevant thereto may be omitted or will be briefly given.

With reference to FIGS. 10A and 10B in conjunction with FIG. 2, the display apparatus 30 according to another embodiment of the present disclosure may further include a partition 600 disposed near a rear surface of the display panel 100. The partition 600 may form an air gap AG or a space where a sound is generated when the display panel 100 is vibrated by a vibration generating device 200. The partition 600 may be referred to as a sound blocking member, a sound separation member, a space separation member, an enclosure, or a baffle, but embodiments of the present disclosure are not limited thereto. The air gap AG may be a vibration space, a sound pressure level space, a sound box, a sound part, a resonance box, or a resonance part, but embodiments of the present disclosure are not limited thereto.

As an example of the present disclosure, the partition 600 may include a material having elasticity which enables a degree of compression. For example, the partition 600 may include polyurethane or polyolefin, but embodiments of the present disclosure are not limited thereto. As another example of the present disclosure, the partition 600 may include a single-sided tape, a double-sided tape, a single-sided foam pad, a double-sided foam pad, a single-sided foam tape, or a double-sided foam tape.

As illustrated in FIG. 10A, the partition 600 may include a first partition 610. The first partition 610 may be disposed between the display panel 100 and a supporting member 300. For example, a first hole 301 disposed at the supporting member 300 may be disposed at a region of the supporting member 300 corresponding to an inner region configured by the first partition 610, but embodiments of the present disclosure are not limited thereto. For example, even when the first partition 610 is disposed, the first hole 301 may be disposed at a region of the supporting member 300 corresponding to the vibration generating device 200. For example, the first hole 301 may be disposed at wholly or a portion of the inner region configured by the first partition. For example, the first hole 301 may be disposed along a periphery of the inner region configured by the first partition 610.

The first partition 610 may be disposed to surround the vibration generating device 200. For example, the first partition 610 may be disposed along a region between a rear periphery of the display panel 100 (or a periphery of a rear surface of the display panel 100) and a front periphery of the supporting member 300 (or a periphery of front surface of the supporting member 300). For example, the first partition 610 may be disposed to surround the entire vibration generating device 200. For example, the first partition 610 may be disposed to be adjacent to a panel connection member 400 or to contact the panel connection member 400 and may be surrounded by the panel connection member 400. As another example of the present disclosure, the first partition 610 and the panel connection member 400 may be implemented as one body or a single-body. The vibration generating device 200 may be the vibration generating device illustrated in FIG. 3 or FIG. 4.

For example, the first partition 610 may have a shape which is the same as or different from a whole shape of the vibration generating device 200. For example, when the vibration generating device 200 has a rectangular shape, the first partition 610 may have a rectangular shape having a size which is relatively greater than that of the vibration generating device 200. As another example of the present disclosure, the first partition 610 may have a circular shape which surrounds the vibration generating device 200.

The first partition 610 may limit (or define) a vibration region (or a vibration area) of the display panel 100 based on the vibration generating device 200. For example, as a size of the air gap AG formed by the first partition 610 increases, the vibration region of the display panel 100 may increase to enhance a characteristic of the low-pitched sound band. On the other hand, as a size of the air gap AG formed by the first partition 610 decreases, the vibration region of the display panel 100 may decrease to enhance a characteristic of the high-pitched sound band. Accordingly, the arrangement of the first partition 610 may be adjusted based on a characteristic of a range of a sound band which is to be generated by a vibration of the display panel 100.

As illustrated in FIG. 10B, the partition 600 may further include a second partition 620. The second partition 620 may be disposed at the rear surface of the display panel 100 between the first partition 610 and the vibration generating device 200. For example, as illustrated in FIG. 10B, a first hole 301 may be disposed at a region of a supporting member 300 corresponding to an inner region disposed by the second partition 620, but embodiments of the present disclosure are not limited thereto.

For example, the first hole 301 may be disposed at wholly of the inner region formed by the second partition 620 and a portion of the second partition 620. For example, the first hole 301 may be disposed along a periphery of the inner region formed by the second partition 620. Alternatively, the first hole 301 may be disposed at a region of the supporting member 300 corresponding to the inner region formed by the second partition 620.

For example, the second partition 620 may be disposed to surround the vibration generating device 200, but embodiments of the present disclosure are not limited thereto. According to an embodiment of the present disclosure, the second partition 620 may have a shape which is the same as or different from a whole shape of the vibration generating device 200 and/or the first partition 610. For example, when the vibration generating device 200 and the first partition 610 have a rectangular shape, the second partition 620 may have a size which is relatively greater than that of the vibration generating device 200. For example, the second partition 620 may have a size which is relatively less than that of the first partition 610. For example, the second partition 620 may have a rectangular shape. As another example, the second partition 620 may have a circular shape which surrounds the vibration generating device 200.

The second partition 620 may limit (or define) a vibration region (or a vibration area) of the display panel 100 based on the vibration generating device 200. For example, as a size of the second partition 620 increases, the vibration region of the display panel 100 may increase to enhance a characteristic of the low-pitched sound band. On the other hand, as a size of the second partition 620 decreases, the vibration region of the display panel 100 may decrease to enhance a characteristic of the high-pitched sound band. Accordingly, the arrangement of the second partition 620 may be adjusted based on a characteristic of a range of a sound band which is to be generated by a vibration of the display panel 100.

Therefore, the display apparatus 30 according to an embodiment of the present disclosure may include the partition 600, and thus, may realize a reproduction band of a sound. For example, the display apparatus 30 according to an embodiment of the present disclosure may include at least one or more of the first and second partitions 610 and 620.

The display apparatus 40 illustrated in FIG. 11 may be implemented by adding a partition 700 to the display apparatus 20 of FIG. 7. Hereinafter, therefore, repetitive descriptions of elements other than a partition and elements relevant thereto may be omitted or will be briefly given.

With reference to FIG. 11 in conjunction with FIG. 7, the display apparatus 40 according to another embodiment of the present disclosure may further include a partition 700 disposed at the rear surface of the display panel 100. The partition 700 may form an air gap AG or a space where a sound is generated when the display panel 100 is vibrated by a vibration generating device 200. The partition 700 may be referred to as a sound blocking member, a sound separation member, a space separation member, an enclosure, or a baffle, but embodiments of the present disclosure are not limited thereto. The air gap AG may be a vibration space, a sound pressure level space, a sound box, a sound part, a resonance box, or a resonance part, but embodiments of the present disclosure are not limited thereto.

The partition 700 according to an embodiment of the present disclosure may spatially separate first and second regions A1 and A2 of the display panel 100. For example, when the display panel 100 is vibrated by the first and second vibration generating devices 201 and 202, the partition 700 may separate sound or separate channels, and may prevent or reduce sound characteristics deterioration by interference of a sound. The first vibration generating devices 201 may vibrate the first region A1 of the display panel 100, and the second vibration generating devices 202 may vibrate the second region A2 of the display panel 100.

Moreover, a first hole 301 disposed at a supporting member 300 may be disposed to correspond to each of first and second vibration generating devices 201 and 202. According to an embodiment of the present disclosure, an area of a $1\text{-}1^{st}$ hole disposed to correspond to the first vibration generating device 201 and an area of a $1\text{-}2^{nd}$ hole disposed to correspond to the second vibration generating device 202 may be the same or differ based on the intensity of a sound wave generated by the first and second vibration generating devices 201 and 202. For example, when the first vibration generating device 201 generates a sound wave having first intensity and the second vibration generating device 202 generates a sound wave having second intensity which is less than the first intensity, a total area of the $1\text{-}1^{st}$ hole disposed to correspond to the first vibration generating device 201 may be greater than a total area of the $1\text{-}2^{nd}$ hole disposed to correspond to the second vibration generating device 202.

For example, an area of each $1\text{-}1^{st}$ hole disposed to correspond to the first vibration generating device 201 may be the same as that of each $1\text{-}2^{nd}$ hole disposed to correspond to the second vibration generating device 202, and the number of $1\text{-}1^{st}$ holes disposed to correspond to the first vibration generating device 201 may be greater than the number of $1\text{-}2^{nd}$ holes disposed to correspond to the second vibration generating device 202. Alternatively, each of the $1\text{-}1^{st}$ holes disposed to correspond to the first vibration generating device 201 may have an area which is greater than that of each of the $1\text{-}2^{nd}$ holes disposed to correspond to the second vibration generating device 202, and the number of $1\text{-}1^{st}$ holes disposed to correspond to the first vibration generating device 201 may be less than the number of $1\text{-}2^{nd}$ holes disposed to correspond to the second vibration generating device 202.

A partition 700 according to an embodiment of the present disclosure may further include first and second partitions 710 and 720 disposed between the first and second vibration generating devices 201 and 202. The first and second partitions 710 and 720 may be disposed to be spaced apart from each other by a certain interval. For example, the first and second partitions 710 and 720 may be disposed in parallel.

The first and second partitions 710 and 720 may be disposed between a center region of a display panel 100 and a supporting member 300 and may spatially separate first and second regions A1 and A2 of the display panel 100. The first and second partitions 710 and 720 may separate a first sound and a second sound generated by the first and second vibration generating devices 201 and 202. Accordingly, the first and second partitions 710 and 720 may be disposed between the first and second vibration generating devices 201 and 202.

For example, the first and second partitions 710 and 720 may block the transfer of a vibration, generated by the first vibration generating device 201 at the first region A1 of the display panel 100, to the second region A2 of the display panel 100, or may block the transfer of a vibration, generated by the second vibration generating device 202 at the second region A2 of the display panel 100, to the first region A1 of the display panel 100.

Therefore, the first and second partitions 710 and 720 may attenuate or absorb a vibration of the display panel at a center of the display panel 100, and thus, may block the transfer of a sound of the first region A1 to the second region A2 or may block the transfer of a sound of the second region A2 to the first region A1. Accordingly, the first and second partitions 710 and 720 may separate a left sound and a right sound to more enhance a sound output characteristic of the display apparatus, and thus, the display apparatus according to an embodiment of the present disclosure may separate the left and right sounds based on the first and second partitions 710 and 720 to output a sound or a 2-channel stereo sound in a forward direction of the display panel 100.

As another example, one of the first and second partitions 710 and 720 may be omitted. Even in this case, one of the first and second partitions 710 and 720 may be disposed between the first and second vibration generating devices 201 and 202, and thus, may separate the left and right sounds. For example, when the second partition 720 is omitted, the first partition 710 may be disposed between the display panel 100 and the supporting member 300 to correspond to a rear center line CL of the display panel 100. On the other hand, when the first partition 710 is omitted, the second partition 720 may be disposed between the display panel 100 and the supporting member 300 to correspond to the rear center line CL of the display panel 100.

Therefore, the left and right sounds may be separated by the first and second partitions 710 and 720, and thus, a sound output characteristic of the display apparatus may be more enhanced and a display apparatus including the first partition 710 or the second partition 720 may separate the left and right sounds based on the first partition 710 or the second partition 720 to output the sound or the 2-channel stereo sound in the forward direction of the display panel 100.

The partition 700 according to an embodiment of the present disclosure may further include a third partition 730 disposed between the display panel 100 and the supporting member 300. The third partition 730 may be disposed along a region between a rear periphery of the display panel 100 (or a periphery of a rear surface of the display panel 100) and a front periphery of the supporting member 300 (or a periphery of a front surface of the supporting member 300) to surround all of the first and second vibration generating devices 201 and 202. The third partition 730 may be referred to as an edge partition, a sound blocking member, an edge enclosure, or an edge baffle, but the terms are not limited thereto. For example, the third partition 730 may be disposed to be adjacent to a panel connection member 400 or to contact the panel connection member 400 and may be surrounded by the panel connection member 400. As another example of the present disclosure, the third partition 730 and the panel connection member 400 may be implemented as one body or a single-body.

The third partition 730 may provide first to third air gaps AG1 to AG3 between the display panel 100 and the supporting member 300 along with the first and second partitions 710 and 720. For example, each of the first to third air gaps AG1 to AG3 may be referred to as a vibration space, a sound pressure level space, a sound box, a sound part, a resonance box, or a resonance part, but embodiments of the present disclosure are not limited thereto.

The first air gap AG1 may be provided at the first region A1 of the display panel 100 surrounded by the first partition 710 and the third partition 730 disposed at the first region A1 of the display panel 100.

The second air gap AG2 may be provided at the second region A2 of the display panel 100 surrounded by the second partition 720 and the third partition 730 disposed at the second region A2 of the display panel 100.

The third air gap AG3 may be provided at a rear center region of the display panel 100 surrounded by the first and second partitions 710 and 720 and the third partition 730. For example, the third air gap AG3 may be provided between the first air gap AG1 and the second air gap AG2 including the rear center line CL of the display panel 100. The third air gap AG3 may be referred to as a sound separation space, a sound shield space, or a sound interference prevention space, but the terms are not limited thereto. The third air gap AG3 may spatially separate the first air gap AG1 and the second air gap AG2, and thus, may prevent a resonance phenomenon or an interference phenomenon in a certain frequency band generated in each of the first air gap AG1 and the second air gap AG2.

The first vibration generating device 201 may be surrounded by the first partition 710 and the third partition 730 providing the first air gap AG1, and the second vibration generating device 202 may be surrounded by the second partition 720 and the third partition 730 providing the second air gap AG2. When one of the first and second partitions 710 and 720 is omitted, the third air gap AG3 may be omitted.

Therefore, the third partition 730 may individually surround each of the first and second vibration generating devices 201 and 202 along with the first and second partitions 710 and 720, and thus, a sound pressure level characteristic of each of left and right sounds may increase by securing a vibration space of each of the first and second vibration generating devices 201 and 202 and a sound or a sound pressure level may be prevented from being leaked to the outside through a side surface (or a lateral side surface) between the display panel 100 and the supporting member 300, thereby more enhancing a sound output characteristic of a display apparatus.

The partition 700 according to an embodiment of the present disclosure may further include a fourth partition 740 (or a first enclosure) surrounding the first vibration generating device 201 and a fifth partition 750 (or a second enclosure) surrounding the second vibration generating device 202.

The fourth partition 740 may be disposed between the display panel 100 and the supporting member 300 to correspond to the first air gap AG1 and may independently surround the first vibration generating device 201. The fourth partition 740 according to an embodiment of the present disclosure may have a tetragonal shape surrounding the first vibration generating device 201, but embodiments of the present disclosure are not limited thereto and may have a shape which is the same as or different from a wholly shape of the first vibration generating device 201. For example, when the first vibration generating device 201 has a square shape, the fourth partition 740 may have a square shape, which is relatively greater in size than the first vibration generating device 201, or a circular shape, or an oval shape.

The fourth partition 740 may limit (or define) a vibration region (or a vibration area) of the display panel 100 based on the first vibration generating device 201. For example, as a size of the fourth partition 740 increases, a vibration region of the first region A1 may increase to enhance a sound characteristic of the low-pitched sound band of the left sound. On the other hand, as a size of the fourth partition 740 decreases, the vibration region of the first region A1 may decrease to enhance a sound characteristic of the high-pitched sound band of the left sound. Accordingly, a size of the fourth partition 740 may be adjusted based on a characteristic of a ranged of a sound band desired by a vibration of the display panel 100.

The fifth partition 750 may be disposed between the display panel 100 and the supporting member 300 to correspond to the second air gap AG2 and may independently surround the second vibration generating device 202. The fifth partition 750 according to an embodiment of the present disclosure may have the same shape as that of the fourth partition 740 and may have a symmetrical structure with the fourth partition 740 with respect to the rear center line CL of the display panel 100, for symmetricity between the left sound and the right sound. Its repetitive description may be omitted.

The fifth partition 750 may limit (or define) a vibration region (or a vibration area) of the display panel 100 based on the second vibration generating device 202. For example, as a size of the fifth partition 750 increases, a vibration region of the second region A2 may increase to enhance a sound characteristic of the low-pitched sound band of the right sound. On the other hand, as a size of the fifth partition 750 decreases, the vibration region of the second region A2 may decrease to enhance a sound characteristic of the high-pitched sound band of the right sound. Accordingly, a size of the fifth partition 750 may be adjusted based on a characteristic of a range of a sound band desired by a vibration of the display panel 100.

The fourth and fifth partitions 740 and 750 may limit the vibration regions (or the vibration areas) of the first and second vibration generating devices 201 and 202, and thus, may enhance the left-right symmetricity of the left sound and the right sound generated by a vibration of the display panel 100 and may optimize a sound pressure level characteristic and a reproduction band of a sound of each of the left sound and the right sound. As another example, when the fourth and fifth partitions 740 and 750 are disposed, the third partition 730 may be omitted. As another example, when the fourth and fifth partitions 740 and 750 are disposed, one or more of the first partition 710, the second partition 720, and the third partition 730 may be omitted.

Therefore, the display apparatus 40 according to an embodiment of the present disclosure may include the partition 700, and thus, may optimize a sound pressure level characteristic and a reproduction band of a sound of each of the left sound and the right sound. For example, the display apparatus 40 according to an embodiment of the present disclosure may include at least one or more of the first and second partitions 710 and 720. As another example, the display apparatus 40 according to an embodiment of the present disclosure may include the third partition 730 and one or more of the first and second partitions 710 and 720. As another example, the display apparatus 40 according to an embodiment of the present disclosure may include the third to fifth partitions 730 to 750. As another example of the present disclosure, the display apparatus 40 according to an embodiment of the present disclosure may include all of the first to fifth partitions 710 to 750.

Therefore, the display apparatus 40 according to another embodiment of the present disclosure may output the left sound and the right sound in the forward direction of the display panel 100 through the first and second vibration generating devices 201 and 202 to provide a sound or a stereo sound to a user and may separate the left and right sounds based on the partition 700 to output a sound or a 2-channel stereo sound in the forward direction of the display panel 100.

FIGS. 12A to 12D illustrate an embodiment of a first hole in the display apparatus of FIG. 11. For description, the arrangement of the first holes 301 may be divided as in FIGS. 12A to 12D, but the arrangements of the first holes 301 of FIGS. 12A to 12D may be combined.

Figure 12A:
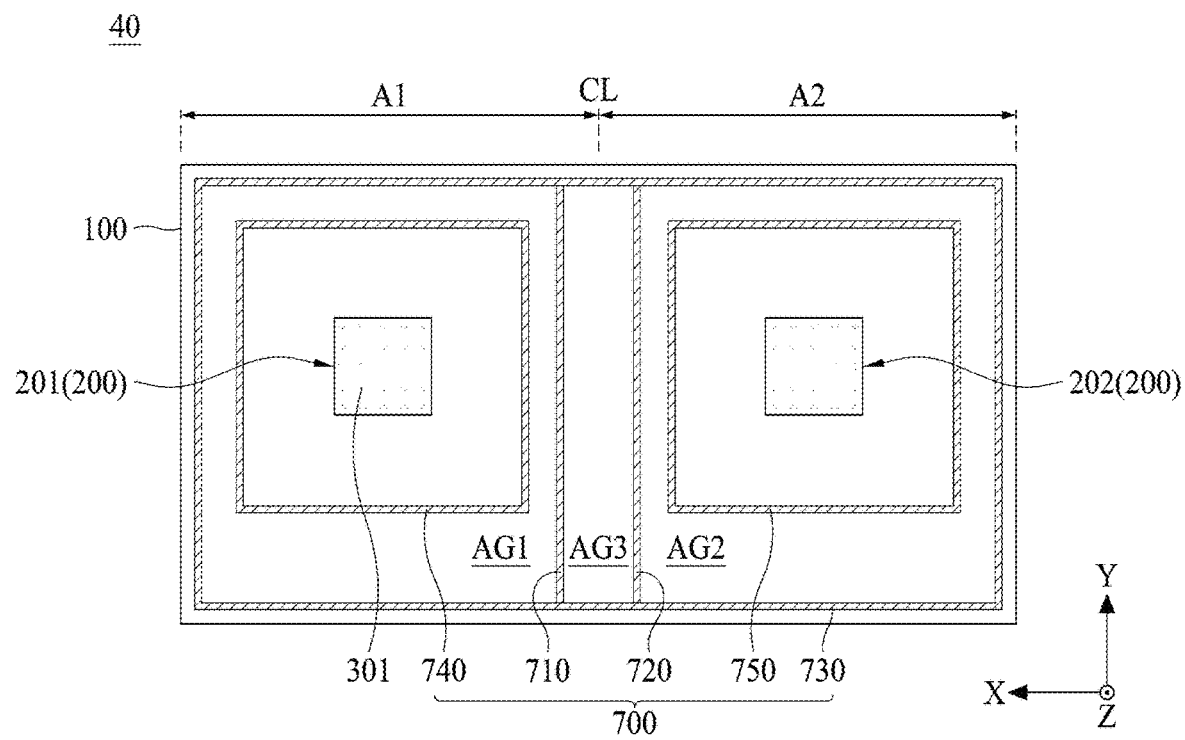
FIG. 12A illustrates an arrangement of a first hole according to embodiment of the present disclosure in the display apparatus illustrated in FIG. 11.

As illustrated in FIG. 12A, in the supporting member 300, the first hole 301 may be disposed at a region corresponding to the first vibration generating device 201 and a region corresponding to the second vibration generating device 202. According to an embodiment of the present disclosure, at least one or more of the first to fifth partitions 710 to 750 may be disposed at the display panel 100.

Figure 12B:
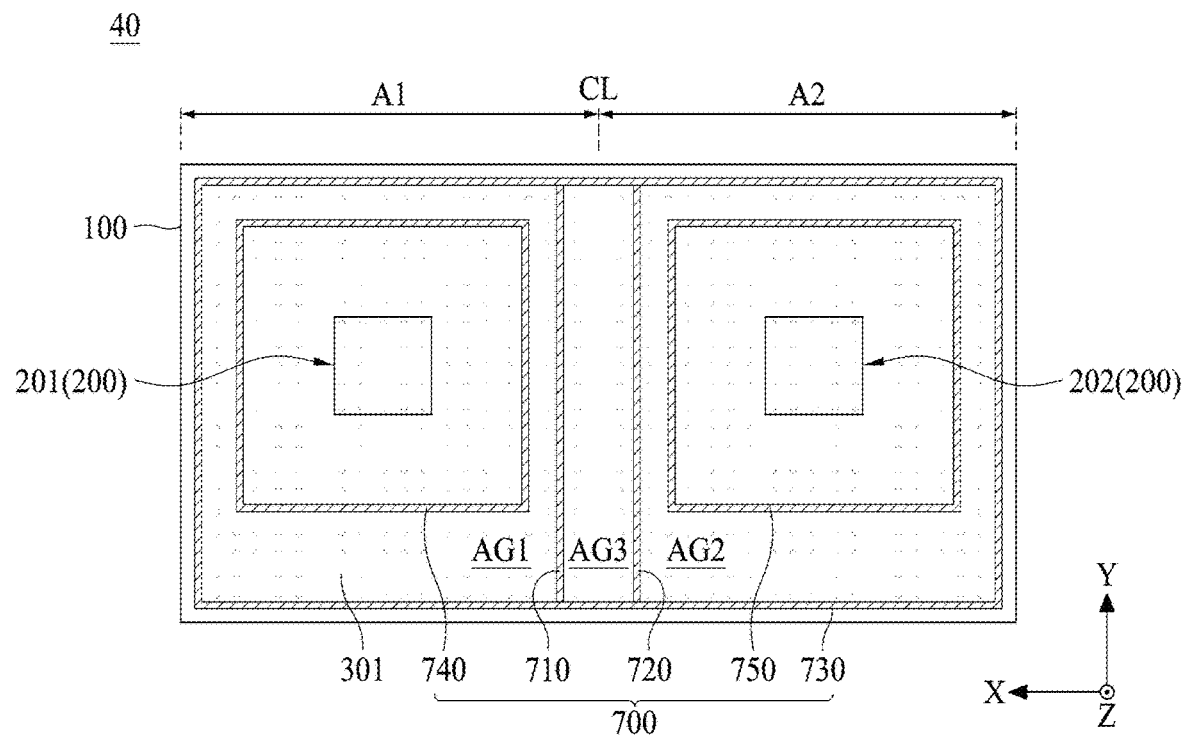
FIG. 12B illustrates an arrangement of a first hole according to embodiment of the present disclosure in the display apparatus illustrated in FIG. 11.

As illustrated in FIG. 12B, in the supporting member 300, the first hole 301 may be disposed at a region corresponding to an inner region of the third partition 730. According to an embodiment of the present disclosure, the first, second, fourth, and fifth partitions 710, 720, 740, and 750 may not be disposed at the display panel 100, and at least one or more of the first, second, fourth, and fifth partitions 710, 720, 740, and 750 may be disposed at the display panel 100.

Figure 12C:
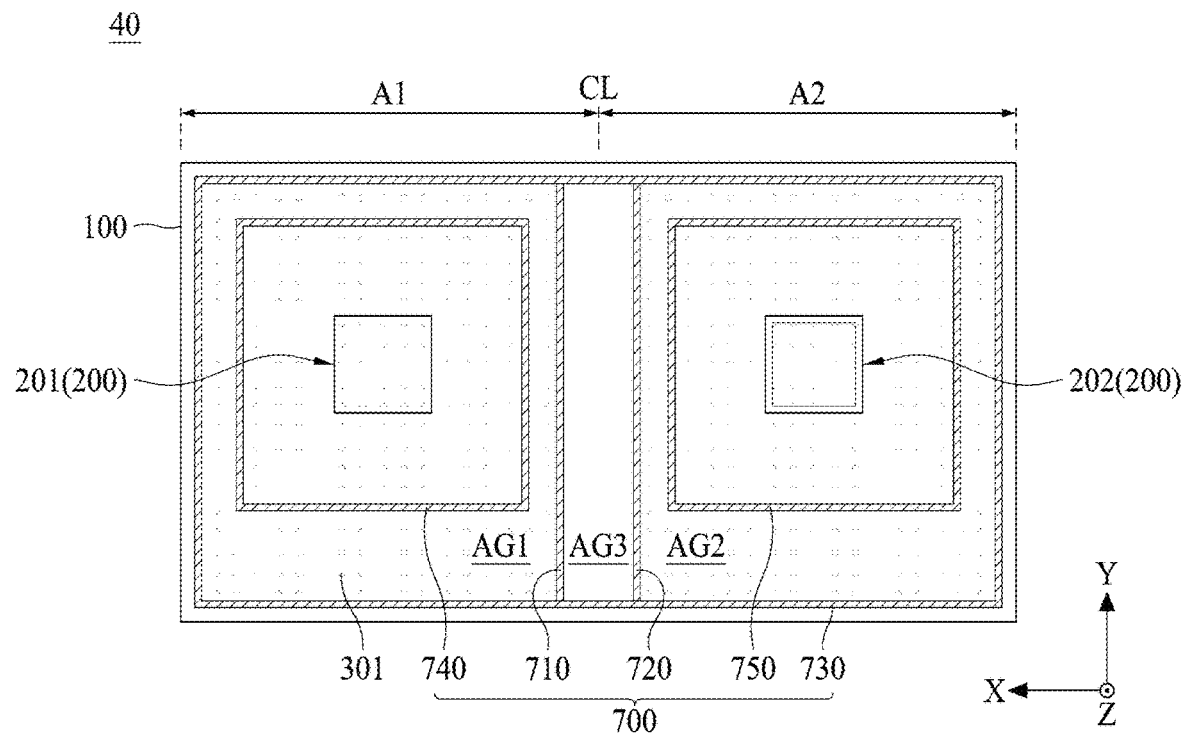
FIG. 12C illustrates an arrangement of a first hole according to embodiment of the present disclosure in the display apparatus illustrated in FIG. 11.

As illustrated in FIG. 12C, in the supporting member 300, the first hole 301 may be disposed at a region corresponding to the first air gap AG1 surrounded by the first partition 710 and the third partition 730 and a region corresponding to the second air gap AG2 surrounded by the second partition 720 and the third partition 730. According to an embodiment of the present disclosure, the fourth and fifth partitions 740 and 750 may not be disposed at the display panel 100, and one or more of the fourth and fifth partitions 740 and 750 may be disposed at the display panel 100.

According to an embodiment of the present disclosure, when only one of the first and second partitions 710 and 720 is disposed at the display panel 100, the first hole 301 at the supporting member 300 may be disposed at a region corresponding to the first and second air gaps AG1 and AG2 provided by the first partition 710 or the second partition 720 and the third partition 730.

Figure 12D:
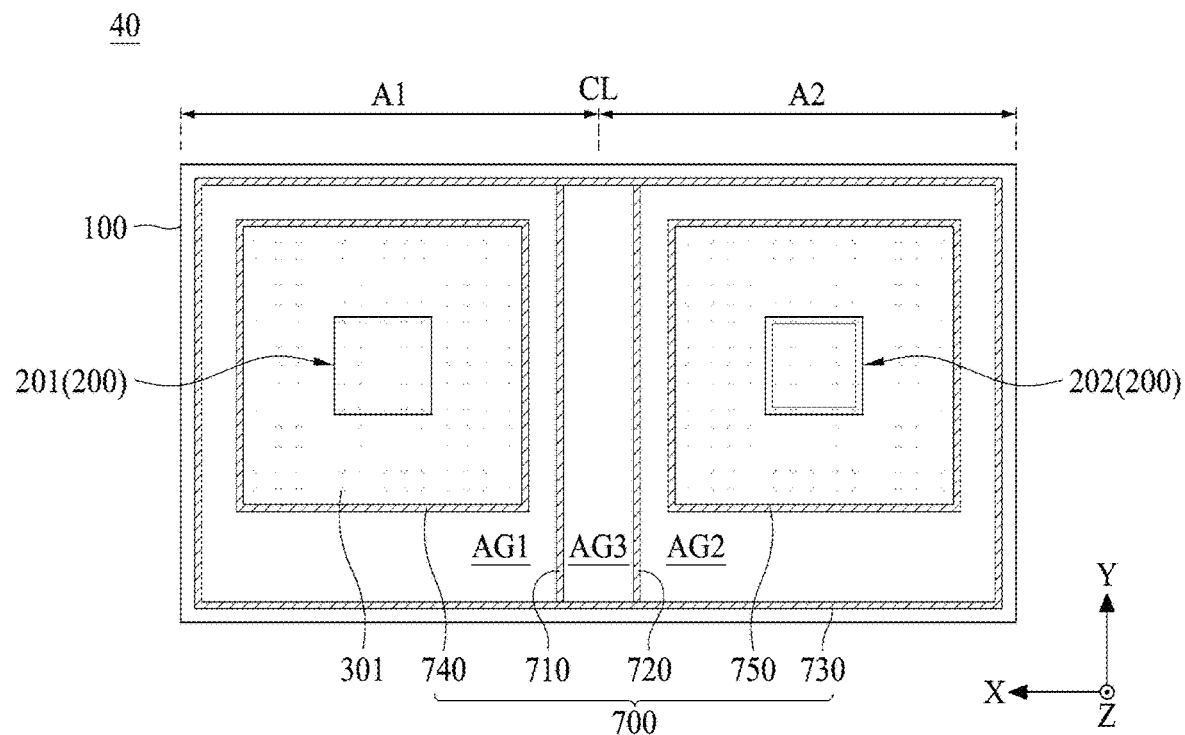
FIG. 12D illustrates an arrangement of a first hole according to embodiment of the present disclosure in the display apparatus illustrated in FIG. 11.

As illustrated in FIG. 12D, in the supporting member 300, the first hole 301 may be disposed at a region corresponding to an inner region of the fourth partition 740 and a region corresponding to an inner region of the fifth partition 750. According to an embodiment of the present disclosure, the first to third partitions 710 to 730 may not be disposed at the display panel 100, and at least one or more of the first to third partitions 710 to 730 may be disposed at the display panel 100.

In FIGS. 12A to 12D, the first hole 301 may be wholly disposed at each of the regions, but embodiments of the present disclosure are not limited thereto. For example, the first hole 301 may be disposed at a portion of each of the regions.

Figure 13:
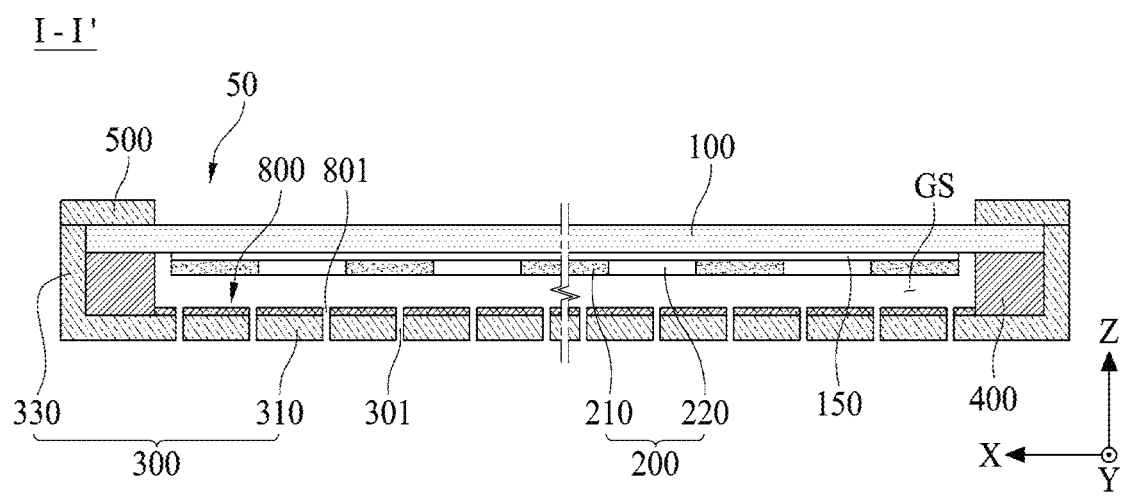
FIG. 13 is a cross-sectional view taken along line I-I' illustrated in FIG. 1 in the display apparatus according to another embodiment of the present disclosure.
Figure 14:
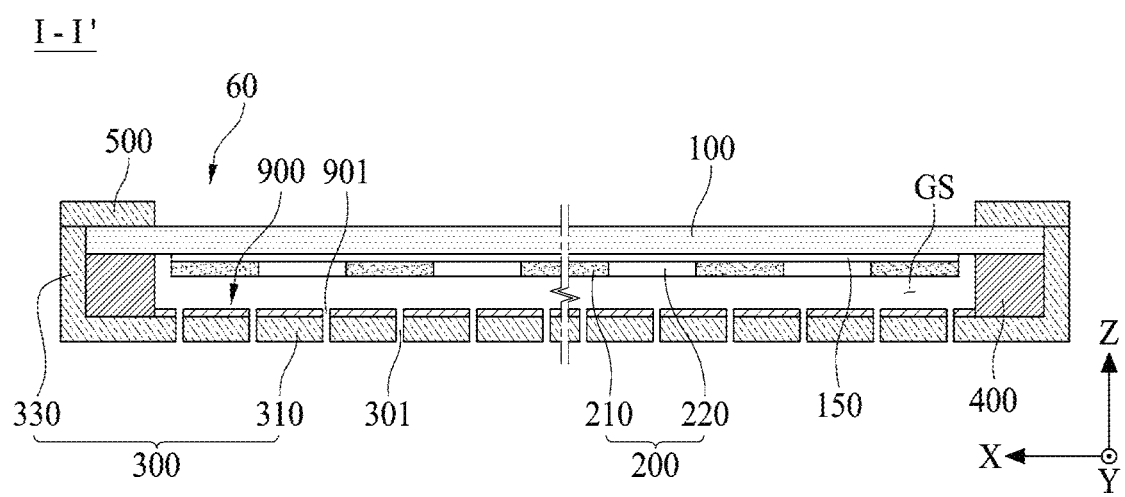
FIG. 14 is a cross-sectional view taken along line I-I' illustrated in FIG. 1 in the display apparatus according to another embodiment of the present disclosure.

FIGS. 13 and 14 are cross-sectional views taken along line I-I' illustrated in FIG. 1 in a display apparatus according to another embodiment of the present disclosure. Hereinafter, therefore, repetitive descriptions of elements other than a modified element may be omitted or will be briefly given.

With reference to FIG. 13, a display apparatus 50 may include a sound absorbing member 800 disposed at an inner surface of a supporting member 300 (for example, a surface (an inner surface or a first surface) facing a vibration generating device 200 among surfaces of the supporting member 300). As the sound absorbing member 800 is disposed at the inner surface of the supporting member 300, even when a sound wave generated by the vibration generating device 200 may vibrate the supporting member 300, a vibration of the supporting member 300 may be partially absorbed and reduced by the sound absorbing member 800, thereby enhancing a sound characteristic of the low-pitched sound band.

As illustrated in FIG. 13, the sound absorbing member 800 may include a second hole 801 disposed at a region corresponding to the first hole 301 so that air passes through the sound absorbing member 800. When the sound absorbing member 800 absorbs a sound wave to decrease an air pressure, the second hole 801 may not be provided. As another example of the present disclosure, when the sound absorbing member 800 is configured to have a hole shape, a size of the second hole 801 may be adjusted to be small.

In FIG. 13, an example where the sound absorbing member 800 is applied to the display apparatus 10 of FIG. 2 is illustrated, but the sound absorbing member 800 may also be identically applied to the display apparatus 20 of FIG. 7. When the sound absorbing member 800 is applied to the display apparatus 20 of FIG. 7, the second hole 801 may be disposed to correspond to the first hole which is disposed to correspond to the first and second vibration generating devices 201 and 202.

With reference to FIG. 14, a display apparatus 60 according to an embodiment of the present disclosure may include a vibration plate 900 which is disposed at an inner surface of a supporting member 300 to realize a low-pitched sound. As the vibration plate 900 is provided, the vibration plate 900 may vibrate based on a sound wave generated by a vibration generating device 200 to generate a low-pitched sound, thereby enhancing a sound characteristic of the low-pitched sound band. For example, the vibration plate 900 may be referred to as the other term such as a plate, a rear vibration plate, a rear surface vibration plate a sound plate, a rear sound plate, an auxiliary vibration plate, or a sub vibration plate. For example, the vibration plate 900 may include at least one or more among a metal material, a plastic material, a fiber material, a leather material, a wood material, a paper material, and a glass material based on a sound characteristic or a sound characteristic of the low-pitched sound band) needed for a display apparatus 60.

In FIG. 14, in the vibration plate 900, a third hole 901 may be disposed at a region corresponding to a first hole 301, but embodiments of the present disclosure are not limited thereto. For example, the third hole 901 may not be provided.

In FIG. 14, an example where the vibration plate 900 is applied to the display apparatus 10 of FIG. 2 is illustrated, but the vibration plate 900 may also be identically applied to the display apparatus 20 of FIG. 7. When the vibration plate 900 is applied to the display apparatus 20 of FIG. 7, the third hole 901 may be disposed to correspond to the first hole which is disposed to correspond to the first and second vibration generating devices 201 and 202.

A vibration generating device according to an embodiment of the present disclosure may be applied to a vibration generating device disposed at a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic books, portable multimedia players (PMPs), personal digital assistants (PDAs), MP3 players, mobile medical apparatuses, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration generating device according to the present disclosure may be applied to organic light emitting lighting apparatuses or inorganic light emitting lighting apparatuses. When the vibration generating device of the present disclosure is applied to a lighting apparatuses, the vibration generating device may act as lighting and a speaker. Also, when the display apparatus of the present disclosure is applied to a mobile device, the vibration generating device may act as one or more of a speaker, a receiver, and a haptic, but embodiments of the present disclosure are not limited thereto.

A display apparatus according to an embodiment of the present disclosure will be described below.

According to an embodiment of the present disclosure, a display apparatus may include a display panel configured to display an image, a vibration generating device at a rear surface of the display panel to vibrate the display panel, and a supporting member at the rear surface of the display panel and including a first hole.

According to some embodiments of the present disclosure, the first hole may be disposed at a whole region or a periphery of the vibration generating device.

According to some embodiments of the present disclosure, an area of the first hole may be the same or differs based on intensity of a sound wave generated by the vibration generating device.

According to some embodiments of the present disclosure, a total area of the first hole, disposed at a first region which a sound wave having first intensity reaches, may be greater than a total area of the first hole disposed at a second region which a sound wave having lower second intensity than the first intensity reaches.

According to some embodiments of the present disclosure, an area of each first hole disposed at the first region may be the same as an area of each first hole disposed at the second region, and the number of first holes disposed at the first region may be greater than the number of first holes disposed at the second region.

According to some embodiments of the present disclosure, an area of each first hole disposed at the first region may be greater than an area of each first hole disposed at the second region, and the number of first holes disposed at the first region may be less than the number of first holes disposed at the second region.

According to some embodiments of the present disclosure, the display apparatus may further include a sound absorbing member disposed at a surface facing the vibration generating device among surfaces of the supporting member.

According to some embodiments of the present disclosure, the sound absorbing member may further include a second hole corresponding to the first hole.

According to some embodiments of the present disclosure, the display apparatus may further include a vibration plate disposed at a surface facing the vibration generating device among surfaces of the supporting member.

According to some embodiments of the present disclosure, the vibration plate may be configured to vibrate based on a sound wave generated by the vibration generating device to generate a low-pitched sound.

According to some embodiments of the present disclosure, the vibration plate may further include a second hole corresponding to the first hole.

According to some embodiments of the present disclosure, the display apparatus may further include a first partition between the rear surface of the display panel and the supporting member to surround the vibration generating device, the first hole may be disposed at an inner region of the first partition.

According to some embodiments of the present disclosure, a size of the first partition may be adjusted based on a range of a sound band to be generated by a vibration of the display panel caused by the vibration generating device.

According to some embodiments of the present disclosure, the display apparatus may further include a first partition between the rear surface of the display panel and the supporting member, the first partition surrounding the vibration generating device, and a second partition between the vibration generating device and the first partition, the second partition surrounding the vibration generating device, the first hole may be disposed at an inner region of the second partition.

According to some embodiments of the present disclosure, a size of the second partition my be adjusted based on a range of a sound band to be generated by a vibration of the display panel caused by the vibration generating device.

According to some embodiments of the present disclosure, the vibration generating device may be configured to be provided as one or more at the rear surface of the display panel, and the first hole may be disposed at each of the one or more vibration generating devices.

According to some embodiments of the present disclosure, the vibration generating device may include a plurality of inorganic material portion having a piezoelectric characteristic, and an organic material portion connected between the plurality of inorganic material portion.

According to some embodiments of the present disclosure, the vibration generating device may include a piezoelectric composite layer including a plurality of inorganic material portion having a piezoelectric characteristic and an organic material portion between the plurality of inorganic material portion, a first protection layer disposed at a first surface of the piezoelectric composite layer, and a second protection layer disposed at a second surface opposite to the first surface of the piezoelectric composite layer.

According to some embodiments of the present disclosure, the vibration generating device may further include a first electrode between each of the plurality of inorganic material portion and the organic material portion and the first protection layer, and a second electrode between each of the plurality of inorganic material portion and the organic material portion and the second protection layer.

According to some embodiments of the present disclosure, the vibration generating device may include a plurality of inorganic material portions and a plurality of organic material portions which are alternately and repeatedly disposed on a same plane.

According to some embodiments of the present disclosure, the vibration generating device may be provided as a plurality of vibration generating devices spaced apart from each other.

According to some embodiments of the present disclosure, the plurality of vibration generating devices may be driven as a single-body vibration device.

According to some embodiments of the present disclosure, the plurality of vibration generating devices may be arranged to have a distance of 0.1 mm or more and less than 3 cm from each other.

According to some embodiments of the present disclosure, the distance may be equal to or more than 0.1 mm and less than 5 mm.

According to an embodiment of the present disclosure, a display apparatus may include a display panel configured to display an image and including a first region and a second region, a first vibration generating device at a rear surface of the display panel to vibrate the first region, a second vibration generating device at the rear surface of the display panel to vibrate the second region, and a supporting member at the rear surface of the display panel, the supporting member may be configured to include a first hole corresponding to the first vibration generating device and the second vibration generating device.

According to some embodiments of the present disclosure, the first hole may be disposed at a whole region or a periphery of the first vibration generating device and a whole region or a periphery of the second vibration generating device.

According to some embodiments of the present disclosure, an area of a first hole corresponding to the first vibration generating device and an area of a first hole corresponding to the second vibration generating device may be the same or differ based on intensity of a sound wave generated by a vibration of each of the first and second vibration generating devices.

According to some embodiments of the present disclosure, the first vibration generating device may be configured to generate a sound wave having first intensity, the second vibration generating device may be configured to generate a sound wave having lower second intensity than the first intensity, and a total area of the first hole corresponding to the first vibration generating device may be greater than a total area of the first hole corresponding to the second vibration generating device.

According to some embodiments of the present disclosure, an area of each first hole corresponding to the first vibration generating device may be the same as an area of each first hole corresponding to the second vibration generating device, and the number of first holes corresponding to the first vibration generating device may be greater than the number of first holes corresponding to the second vibration generating device.

According to some embodiments of the present disclosure, an area of each first hole corresponding to the first vibration generating device may be greater than an area of each first hole corresponding to the second vibration generating device, and the number of first holes corresponding to the first vibration generating device may be less than the number of first holes corresponding to the second vibration generating device.

According to some embodiments of the present disclosure, the display apparatus may further include a sound absorbing member disposed at a surface facing the first and second vibration generating devices among surfaces of the supporting member.

According to some embodiments of the present disclosure, the vibration plate may be configured to vibrate based on a sound wave generated by the first and second vibration generating devices to generate a low-pitched sound.

According to some embodiments of the present disclosure, the sound absorbing member may further include a second hole corresponding to the first hole.

According to some embodiments of the present disclosure, the display apparatus may further include a vibration plate disposed at a surface opposite to the first and second vibration generating devices among surfaces of the supporting member.

According to some embodiments of the present disclosure, the vibration plate may further include a third hole corresponding to the first hole.

According to some embodiments of the present disclosure, the display apparatus may further include a partition between the rear surface of the display panel and the supporting member, the partition may further include at least one or more partitions dividing the first region and the second region, and the first hole may be disposed to correspond to the first region and the second region.

According to some embodiments of the present disclosure, the at least one or more partitions may include at least one or more among a first partition disposed between the first and second vibration generating devices, and a second partition disposed to be spaced apart from the first partition by a certain interval in parallel.

According to some embodiments of the present disclosure, the partition may further include a third partition disposed to surround all of the first and second vibration generating devices, and the first hole may be disposed at an inner region of the third partition.

According to some embodiments of the present disclosure, the display apparatus may further include a first air gap surrounded by the at least one or more partitions and the third partition at the first region, and a second air gap surrounded by the at least one or more partitions and the third partition at the second region, the first hole may be disposed to correspond to the first air gap and the second air gap.

According to some embodiments of the present disclosure, the partition may further include a fourth partition surrounding the first vibration generating device, and a fifth partition surrounding the second vibration generating device, and the first hole may be disposed at an inner region of the fourth partition and an inner region of the fifth partition.

According to some embodiments of the present disclosure, a size of each of the fourth and fifth partitions may be adjusted based on a range of a sound band to be generated by a vibration of the display panel caused by each of the first and second vibration generating devices.

According to some embodiments of the present disclosure, each of the first vibration generating device and the second vibration generating device may include a plurality of inorganic material portions and a plurality of organic material portions which are alternately and repeatedly disposed on a same plane.

According to some embodiments of the present disclosure, each of the first vibration generating device and the second vibration generating device may be provided as a plurality of vibration generating devices spaced apart from each other.

According to some embodiments of the present disclosure, the plurality of vibration generating devices may be driven as a single-body vibration device.

According to some embodiments of the present disclosure, the plurality of vibration generating devices may be arranged to have a distance of 0.1 mm or more and less than 3 cm from each other.

According to some embodiments of the present disclosure, the distance may be equal to or more than 0.1 mm and less than 5 mm.

It will be apparent to those skilled in the art that various modifications and variations may be made in the display apparatus of the present disclosure without departing from the technical idea or scope of the disclosure. Thus, it may be intended that embodiment of the present disclosure cover the modifications and variations of the disclosure provided they come within the scope of the appended claims and their equivalents.

What is claimed is:

1. A display apparatus, comprising:
a display panel configured to display an image;
a vibration generating device at a rear surface of the display panel to vibrate the display panel;
a supporting member at the rear surface of the display panel and including a first hole; and
a vibration plate disposed at a surface facing the vibration generating device among surfaces of the supporting member,
wherein the vibration generating device includes a first surface connected to the display panel and a second surface opposite to the first surface,
wherein a first surface of the vibration plate faces the second surface of the vibration generating device,
wherein a gap space exists between an entirety of the first surface of the vibration plate and an entirety of the second surface of the vibration generating device so that the second surface of the vibration generating device is not on the first surface of the vibration plate, and
wherein the first hole at least partly overlaps with the vibration generating device.

2. The display apparatus of claim 1, wherein the first hole is disposed at a whole region or a periphery of the vibration generating device.

3. The display apparatus of claim 1, wherein an area of the first hole is the same or differs based on intensity of a sound wave generated by the vibration generating device.

4. The display apparatus of claim 3, wherein a total area of the first hole, disposed at a first region which a sound wave having first intensity reaches, is greater than a total area of the first hole disposed at a second region which a sound wave having lower second intensity than the first intensity reaches.

5. The display apparatus of claim 4, wherein an area of each first hole disposed at the first region is the same as an area of each first hole disposed at the second region, and the number of first holes disposed at the first region is greater than the number of first holes disposed at the second region.

6. The display apparatus of claim 4, wherein an area of each first hole disposed at the first region is greater than an area of each first hole disposed at the second region, and the number of first holes disposed at the first region is less than the number of first holes disposed at the second region.

7. The display apparatus of claim 1, further comprising a sound absorbing member disposed at a surface facing the vibration generating device among surfaces of the supporting member.

8. The display apparatus of claim 7, wherein the sound absorbing member further comprises a second hole corresponding to the first hole.

9. The display apparatus of claim 1, wherein the vibration plate is configured to vibrate based on a sound wave generated by the vibration generating device to generate a low-pitched sound.

10. The display apparatus of claim 9, wherein the vibration plate further comprises a second hole corresponding to the first hole.

11. The display apparatus of claim 1, further comprising a first partition between the rear surface of the display panel and the supporting member to surround the vibration generating device,
wherein the first hole is disposed at an inner region of the first partition.

12. The display apparatus of claim 11, wherein a size of the first partition is adjusted based on a range of a sound band to be generated by a vibration of the display panel caused by the vibration generating device.

13. The display apparatus of claim 1, further comprising:
a first partition between the rear surface of the display panel and the supporting member, the first partition surrounding the vibration generating device; and a second partition between the vibration generating device and the first partition, the second partition surrounding the vibration generating device, wherein the first hole is disposed at an inner region of the second partition.

14. The display apparatus of claim 13, wherein a size of the second partition is adjusted based on a range of a sound band to be generated by a vibration of the display panel caused by the vibration generating device.

15. The display apparatus of claim 1,
wherein the vibration generating device is configured to be provided as one or more vibration generating devices at the rear surface of the display panel, and
wherein the first hole is disposed at each of the one or more vibration generating devices.

16. The display apparatus of claim 1, wherein the vibration generating device includes a plurality of inorganic material portions and a plurality of organic material portions which are alternately and repeatedly disposed on a same plane.

17. The display apparatus of claim 1, wherein the vibration generating device is provided as a plurality of vibration generating devices spaced apart from each other.

18. The display apparatus of claim 17, wherein the plurality of vibration generating devices are driven as a single-body vibration device.

19. The display apparatus of claim 17, wherein the plurality of vibration generating devices are laterally along a plane parallel to the display panel and are arranged to have a lateral distance of 0.1 mm or more and less than 3 cm from each other.

20. The display apparatus of claim 19, wherein the lateral distance is equal to or more than 0.1 mm and less than 5 mm.

21. The display apparatus of claim 1, further comprising:
a first partition between the rear surface of the display panel and the supporting member, the first partition surrounding an entirety of the vibration generating device; and
a second partition between the vibration generating device and the first partition, the second partition surrounding an entirety of the vibration generating device,
wherein the second partition is separate and distinct from the first partition such that no part of the second partition is part of the first partition.

22. A display apparatus, comprising:
a display panel configured to display an image and including a first region and a second region;
a first vibration generating device at a rear surface of the display panel to vibrate the first region;
a second vibration generating device at the rear surface of the display panel to vibrate the second region;
a supporting member at the rear surface of the display panel; and
a vibration plate disposed at a surface facing the first and second vibration generating devices among surfaces of the supporting member,
wherein the supporting member is configured to include a first hole corresponding to the first vibration generating device and the second vibration generating device,
wherein each of the first vibration generating device and the second vibration generating device includes a first surface connected to the display panel and a second surface opposite to the first surface,
wherein a first surface of the vibration plate faces the second surface of the first and second vibration generating devices, wherein a gap space exists between an entirety of the first surface of the vibration plate and an entirety of the second surface of the first and second vibration generating devices so that the second surface of the first and second vibration generating devices is not on the first surface of the vibration plate, and wherein the first hole at least partly overlaps with the first vibration generating device and the second vibration generating device.

23. The display apparatus of claim 22, wherein the first hole is disposed at a whole region or a periphery of the first vibration generating device and a whole region or a periphery of the second vibration generating device.

24. The display apparatus of claim 22, wherein an area of the first hole corresponding to the first vibration generating device and an area of the first hole corresponding to the second vibration generating device are the same or differ based on intensity of a sound wave generated by a vibration of each of the first and second vibration generating devices.

25. The display apparatus of claim 24, wherein:
the first vibration generating device is configured to generate a sound wave having first intensity,
the second vibration generating device is configured to generate a sound wave having lower second intensity than the first intensity, and
a total area of the first hole corresponding to the first vibration generating device is greater than a total area of the first hole corresponding to the second vibration generating device.

26. The display apparatus of claim 25, wherein an area of each first hole corresponding to the first vibration generating device is the same as an area of each first hole corresponding to the second vibration generating device, and the number of first holes corresponding to the first vibration generating device is greater than the number of first holes corresponding to the second vibration generating device.

27. The display apparatus of claim 25, wherein an area of each first hole corresponding to the first vibration generating device is greater than an area of each first hole corresponding to the second vibration generating device, and the number of first holes corresponding to the first vibration generating device is less than the number of first holes corresponding to the second vibration generating device.

28. The display apparatus of claim 22, further comprising a sound absorbing member disposed at a surface facing the first and second vibration generating devices among surfaces of the supporting member.

29. The display apparatus of claim 28, wherein the sound absorbing member further comprises a second hole disposed to correspond to the first hole.

30. The display apparatus of claim 22, wherein the vibration plate is configured to vibrate based on a sound wave generated by the first and second vibration generating devices to generate a low-pitched sound.

31. The display apparatus of claim 22, wherein the vibration plate further comprises a third hole disposed to correspond to the first hole.

32. The display apparatus of claim 22, further comprising a partition between the rear surface of the display panel and the supporting member,
wherein the partition further comprises at least one or more partitions dividing the first region and the second region, and
wherein the first hole is disposed to correspond to the first region and the second region.

33. The display apparatus of claim 32, wherein the at least one or more partitions comprise at least one or more among a first partition disposed between the first and second vibration generating devices, and a second partition disposed to be spaced apart from the first partition by a certain interval in parallel.

34. The display apparatus of claim 32,
    wherein the partition further comprises a third partition disposed to surround all of the first and second vibration generating devices, and
    wherein the first hole is disposed at an inner region of the third partition.

35. The display apparatus of claim 34, further comprising:
    a first air gap surrounded by the at least one or more partitions and the third partition at the first region; and
    a second air gap surrounded by the at least one or more partitions and the third partition at the second region,
    wherein the first hole is disposed to correspond to the first air gap and the second air gap.

36. The display apparatus of claim 33,
    wherein the partition further comprises:
    a fourth partition surrounding the first vibration generating device; and
    a fifth partition surrounding the second vibration generating device, and
    wherein the first hole is disposed at an inner region of the fourth partition and an inner region of the fifth partition.

37. The display apparatus of claim 36, wherein a size of each of the fourth and fifth partitions is adjusted based on a range of a sound band to be generated by a vibration of the display panel caused by each of the first and second vibration generating devices.

38. The display apparatus of claim 22, wherein each of the first vibration generating device and the second vibration generating device includes a plurality of inorganic material portions and a plurality of organic material portions which are alternately and repeatedly disposed on a same plane.

39. The display apparatus of claim 22, wherein each of the first vibration generating device and the second vibration generating device is provided as a plurality of vibration generating devices spaced apart from each other.

40. The display apparatus of claim 39, wherein the plurality of vibration generating devices are driven as a single-body vibration device.

41. The display apparatus of claim 39, wherein the plurality of vibration generating devices are arranged to have a distance of 0.1 mm or more and less than 3 cm from each other.

42. The display apparatus of claim 41, wherein the distance is equal to or more than 0.1 mm and less than 5 mm.

43. The display apparatus of claim 22, further comprising:
    a first partition between the rear surface of the display panel and the supporting member, the first partition surrounding an entirety of the first vibration generating device; and
    a second partition between the first vibration generating device and the first partition, the second partition surrounding an entirety of the first vibration generating device,
    wherein the second partition is separate and distinct from the first partition such that no part of the second partition is part of the first partition.

44. The display apparatus of claim 43, further comprising:
    a third partition and a fourth partition disposed between the first and second vibration generating devices and disposed in parallel,
    wherein:
    a third region is formed and surrounded by the third and fourth partitions and portions of the first partition; and
    no vibration generating device exists in the third region.

* * * * *